(12) United States Patent
Kobayashi et al.

(10) Patent No.: US 8,404,371 B2
(45) Date of Patent: Mar. 26, 2013

(54) BIAXIALLY ORIENTED POLYESTER FILM AND MAGNETIC RECORDING TAPE

(75) Inventors: Ieyasu Kobayashi, Gifu (JP); Shinji Muro, Gifu (JP); Takeshi Ishida, Gifu (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 13/117,224

(22) Filed: May 27, 2011

(65) Prior Publication Data
US 2011/0229738 A1 Sep. 22, 2011

Related U.S. Application Data

(62) Division of application No. 12/278,885, filed as application No. PCT/JP2006/326369 on Dec. 27, 2006, now abandoned.

(30) Foreign Application Priority Data

Feb. 9, 2006 (JP) .................................. 2006-032343

(51) Int. Cl.
*G11B 5/706* (2006.01)
*G11B 5/60* (2006.01)

(52) U.S. Cl. .................... 428/847.2; 428/847.4; 360/134

(58) Field of Classification Search .................. 428/846, 428/846.4, 847.4, 838, 845.6, 841.1, 482, 428/141, 846.1, 840.2, 831, 847.2, 847.7, 428/847.6, 847.5, 847.3, 36.9; 360/134; 242/160.4
See application file for complete search history.

(56) References Cited

U.S. PATENT DOCUMENTS

| | | |
|---|---|---|
| 6,190,753 B1 | 2/2001 | Koseki et al. |
| 6,770,351 B1 | 8/2004 | Kobayashi et al. |
| 2001/0051257 A1* | 12/2001 | Kobayashi et al. ............ 428/216 |
| 2003/0108775 A1 | 6/2003 | Kobayashi et al. |
| 2003/0148131 A1 | 8/2003 | Tsunekawa et al. |
| 2003/0180562 A1 | 9/2003 | Kobayashi et al. |
| 2004/0069885 A1* | 4/2004 | Kobayashi et al. ......... 242/160.4 |
| 2004/0197509 A1* | 10/2004 | Kobayashi et al. .......... 428/36.9 |
| 2005/0147795 A1 | 7/2005 | Kobayashi et al. |
| 2005/0175866 A1* | 8/2005 | Ohno et al. ................ 428/845.6 |

(Continued)

FOREIGN PATENT DOCUMENTS

| | | |
|---|---|---|
| EP | 0909780 A2 | 4/1999 |
| EP | 0940426 A2 | 8/1999 |

(Continued)

OTHER PUBLICATIONS

Mee, C. Denis et al.; "Magnetic Recording Handbook"; McGraw-Hill, 1990, New York, UIS, ISBN 0-07-041274, pp. 890-891. (cited in European Office Action).

(Continued)

*Primary Examiner* — Kevin M. Bernatz
*Assistant Examiner* — Louis Falasco
(74) *Attorney, Agent, or Firm* — Westerman, Hattori, Daniels & Adrian, LLP

(57) ABSTRACT

A biaxially oriented polyester film which has a Young's modulus (YMD) in the film machine direction (YMD) of 6.5 GPa or more and a Young's modulus in the width direction (YTD) of 8.2 to 9.8 GPa and is used as a base film for magnetic recording tapes of linear recording system, and a magnetic recording tape of linear recording system comprising the same as a base film.

There are provided a biaxially oriented polyester film which has excellent dimensional stability, especially dimensional stability in the width direction and is suitable for use as a base film for magnetic recording tapes of linear recording system and a magnetic recording tape comprising the same.

23 Claims, 1 Drawing Sheet

U.S. PATENT DOCUMENTS

| | | | |
|---|---|---|---|
| 2006/0019123 A1* | 1/2006 | Hayakawa et al. | 428/831 |
| 2007/0230054 A1 | 10/2007 | Takeda et al. | |
| 2007/0281186 A1 | 12/2007 | Yoshida et al. | |
| 2009/0297888 A1 | 12/2009 | Horie et al. | |

FOREIGN PATENT DOCUMENTS

| | | |
|---|---|---|
| EP | 0940426 A2 | 9/1999 |
| EP | 1120225 A1 | 8/2001 |
| JP | 64-032423 A | 2/1989 |
| JP | 05212787 A | 8/1993 |
| JP | 2000-255014 A | 9/2000 |
| JP | 2003-276141 A | 9/2003 |
| JP | 2005-298712 A | 10/2005 |
| JP | 2005-306041 A | 11/2005 |
| JP | 2005-346865 A | 12/2005 |
| JP | 2006-002142 A | 1/2006 |
| JP | 2006-216195 A | 8/2006 |
| JP | 2006-274113 A | 10/2006 |
| JP | 2007-226943 A | 9/2007 |
| WO | 99-29488 A1 | 6/1999 |
| WO | 00-76749 A1 | 12/2000 |
| WO | 02-45959 A1 | 6/2002 |
| WO | 02/47889 A1 | 6/2002 |
| WO | 2005-063485 A1 | 7/2005 |
| WO | WO 2005/063485 A | 7/2005 |
| WO | 2007-034857 A1 | 3/2007 |

OTHER PUBLICATIONS

European Office Action dated Jun. 7, 2010, issued in corresponding European Patent Application No. 06843740.9.

Japanese Office Action dated Oct. 27, 2009, issued in corresponding Japanese Patent Application No. 2007-557753 (With English Translation).

European Search Report dated Jan. 22, 2009, issued in corresponding European Patent Application No. 06843740.9.

Notification of Transmittal of Translation of the International Preliminary Report on Patentability (Form PCT/IB/338) of International Application No. PCT/JP2006/326369 mailed Aug. 21, 2008 with Forms PCT/IB/373 and PCT/ISA/237.

International Search Report of PCT/JP2006/326369, mailed dated Mar. 27, 2007.

Extended European Search Report dated Jan. 22, 2009, issued in corresponding European Patent Application No. 06843740.9.

* cited by examiner (A)

(B)

BIAXIALLY ORIENTED POLYESTER FILM AND MAGNETIC RECORDING TAPE

This application is a divisional application of U.S. Non-Provisional application Ser. No. 12/278,885, filed on Aug. 8, 2008, which is a National Stage of International Application No. PCT/JP2006/326369, filed on Dec. 27, 2006, which is based on and claims priority from Japanese Application No. JP2006-032343, filed on Feb. 9, 2006, the entirety of which is incorporated herein by reference.

TECHNICAL FIELD

The present invention relates to a biaxially oriented polyester film which is suitable for use as a base film for magnetic recording tapes of linear recording system and a magnetic recording tape of linear recording system, comprising the same.

BACKGROUND OF THE ART

A polyester film is used in a magnetic recording tape because it has excellent thermal and mechanical properties. Magnetic recording tapes, especially data storage magnetic recording tapes require a larger storage capacity and a higher recording density as the size of data to be recorded is growing, and the requirements for the characteristic properties of base films constituting the magnetic recording tapes are becoming more severe.

Out of the magnetic recording tapes, magnetic recording tapes for data storage such as QIC, DLT, large-capacity super-DLT and LTO employ linear recording system (also called "linear track system"), and the track pitch is becoming very narrow to realize a large capacity and a high density for the magnetic recording tapes. The dimensional changes rate in the width direction of the magnetic recording tape changes, track dislocation occurs even if the dimensional changes rate in the width direction is so small that it does not cause a problem in the prior art, whereby an error occurs.

The dimensional changes rate in the width direction of the magnetic recording tape are caused by temperature and humidity variations and tension variations. To solve these the dimensional changes rate in the width direction dimensional changes rate in the width direction, the pamphlet of WO99/29488 proposes a biaxially oriented polyester film whose temperature expansion coefficient αt in the width direction ($\times 10^{-6}$/° C.), humidity expansion coefficient αh in the width direction ($\times 10^{-6}$/% RH) and shrinkage factor P (ppm/g) in the width direction for a load which is applied in the longitudinal direction are set to specific ranges. The pamphlet of WO00/76749 and the pamphlet of WO02/45959 also propose a biaxially oriented polyester film whose dimensional changes rate in the width direction when it is left under load in the longitudinal direction, temperature expansion coefficient αt in the width direction ($\times 10^{-6}$/° C.), humidity expansion coefficient αh in the width direction ($\times 10^{-6}$/% RH) and dimensional changes rate in the width direction (%) for a load which is applied in the longitudinal direction are set to specific ranges.

However, the requirements for large storage capacity and high recording density from magnetic recording tapes are becoming more severe nowadays and the biaxially oriented polyester films proposed by these patent documents cannot meet the requirements fully.

DISCLOSURE OF THE INVENTION

It is a first object of the present invention to provide a biaxially oriented polyester film which has excellent dimensional stability, especially dimensional stability in the width direction, and is suitable for use as a base film for magnetic recording tapes of linear recording system, especially linear tape-open (LTO), and a magnetic recording tape comprising the biaxially oriented polyester film.

It is a second object of the present invention to provide a biaxially oriented polyester film which has excellent dimensional stability, especially dimensional stability in the width direction, and film forming properties and is suitable for use as a base film for magnetic recording tapes of linear recording system, especially linear tape-open (LTO), and a magnetic recording tape comprising the biaxially oriented polyester film.

It is a third object of the present invention to provide a biaxially oriented polyester film which has excellent dimensional stability, especially dimensional stability in the width direction, and excellent electromagnetic conversion characteristics and is suitable for use as a base film for magnetic recording tapes of linear recording system, especially linear tape-open (LTO), and a magnetic recording tape comprising the biaxially oriented polyester film.

It is a fourth object of the present invention to provide a biaxially oriented polyester film which has excellent dimensional stability, especially dimensional stability in the width direction, and excellent electromagnetic conversion characteristics and recyclability and is suitable for use as a base film for magnetic recording tapes of linear recording system, especially linear tape-open (LTO), and a magnetic recording tape comprising the biaxially oriented polyester film.

It is a fifth object of the present invention to provide a biaxially oriented polyester film which has excellent dimensional stability, especially dimensional stability in the width direction, excellent electromagnetic conversion characteristics and recyclability and also film forming properties and is suitable for use as a base film for magnetic recording tapes of linear recording system, especially linear tape-open (LTO), and a magnetic recording tape comprising the biaxially oriented polyester film.

When a magnetic recording tape of linear recording system and a magnetic recording tape of helical system are compared with each other, as damage to the edge of the tape does not become problematic in the magnetic recording tape of linear recording system unlike the magnetic recording tape of helical system, a high Young's modulus in the transverse direction of the tape is not required. Since tension applied in the traveling direction of the tape is larger in the tape of linear recording system than that of the tape of helical system, a high Young's modulus in the longitudinal direction is required, and a tape having a higher Young's modulus in the film machine direction than that in the transverse direction is proposed in the above patent documents. Since a high-density magnetic recording tape is becoming extremely thin in order to increase its recording capacity, it is considered that this tendency becomes stronger and stronger.

However, when the inventors of the present invention have conducted intensive studies to solve the above problem, they have found that it is important to enhance the dimensional stability in the width direction where temperature and humidity variations are received more than in the film machine direction because a high-density magnetic recording tape having a storage capacity of more than 500 GB is thin and tension applied during the traveling of the tape is suppressed. As the thickness of the tape is becoming smaller due to the recent demand for high density, the thickness of a base film is becoming smaller but the total thickness of a back coat layer, a magnetic layer and a non-magnetic layer cannot be made very small to achieve surface flatness. Therefore, the proportion of the base film to the magnetic tape is decreasing. Although it has been considered that the temperature expansion coefficient αt in the width direction of the film should be about the same as the temperature expansion coefficient αt of a magnetic head for reading it (about 7 ppm/° C. in the case of a MR head), the temperature expansions of the back coat layer, magnetic layer and non-magnetic layer are large and their influences are large. Therefore, to provide higher dimensional stability, they have found that it is necessary to ease the temperature expansions of these layers with the base film, that is, it is important to provide an extremely low temperature expansion coefficient to the base film.

According to the present invention, there is provided a biaxially oriented polyester film which has a Young's modulus (YMD) in the film machine direction of 6.5 GPa or more and a Young's modulus (YTD) in the width direction of 8.2 to 9.8 GPa and is used as a base film for magnetic recording tapes of linear recording system.

According to the present invention, there is further provided a biaxially oriented polyester film having at least one of features that the polyester is polyethylene-2,6-naphtahlene dicarboxylate, the thickness of the film is 3 to 6 μm, the total of YMD and YTD is 15 to 18 GPa, YTD is equal to or larger than YMD, the temperature expansion coefficient in the width direction of the film is −8 to +1 ppm/° C., the humidity expansion coefficient in the width direction of the film is 5 to 10 ppm/% RH, the heat shrinkage factor (105° C.×30 minutes) in the width direction of the film is 0.8% or less, the rupture elongation in the width direction of the film is 45% or more, the crystallinity of the film is 28 to 33%, the dimensional change rate in the width direction when a load of 32 MPa is applied in the film machine direction in a 40° C. and 90% RH atmosphere is more than 0.3% and 1% or less, the surface roughness (WRa) of at least one surface is 1 to 10 nm, the roughness (WRa) of at least one surface of the film is 1 to 10 nm, the biaxially oriented polyester film is a single-layer film having a surface roughness (WRa) of 1 to 10 nm, the polyester film is a laminate film consisting of two polyester film layers (layers A and B), the layer A is formed on the side on which a magnetic layer is to be formed and has a surface roughness (WRa(A)) of 0.5 to 4 nm, the layer B is formed on the side on which no magnetic layer is to be formed and has a surface roughness (WRa(B)) of 5 to 10 nm, the layer A contains inert particles A having an average particle diameter of 0.01 to 0.18 μm in an amount of 0.01 to 0.15 wt % based on the weight of the layer A, the layer B contains inert particles B1 having an average particle diameter of 0.01 to 0.18 μm in an amount of 0.01 to 0.3 wt % and inert particles B2 having an average particle diameter of 0.2 to 0.4 μm in an amount of 0.01 to 0.2 wt % based on the weight of the layer B, the thickness (t) of the whole film is 3 to 6 μm, the thickness of the layer B accounts for 50 to 90% of the thickness of the whole biaxially oriented polyester laminate film, the layer A contains inert particles A having an average particle diameter of 0.01 to 0.20 μm in an amount of 0.01 to 0.15 wt % based on the weight of the layer A, the total thickness of the film is 3 to 6 μm, the (tB/t) ratio of the thickness (tB) of the layer B to the thickness (t) of the whole film is 10% or more and less than 50%, the layer B contains the inert particles B2 having an average particle diameter of 0.2 to 0.4 μm in an amount of 0.01 to 0.20 wt % based on the weight of the layer B, the (tB/dB) ratio of the thickness (tB) of the layer B to the average particle diameter (dB) of all the inert particles contained in the polyester layer B is 0.5 to 25, the inert particles A are spherical silica particles or heat-resistant polymer particles, the layer B further contains inert particles B1 having an average particles diameter 0.1 μm or more smaller than that of the inert particles B2, the inert particles A and the inert particles B1 are the same inert particles, tB/t is more than 20% and less than 50%, tB/dB is 5 to 25, tB/t is 10 to 20%, tB/dB is 0.5 to 10, and the inert particles B2 are crosslinked organic particles.

According to the present invention, there are further provided a magnetic recording tape of linear recording system which comprises the above biaxially oriented polyester film of the present invention, a non-magnetic layer and a magnetic layer formed on one side of the film, and a back coat layer formed on the other side, and a magnetic recording tape in which the ratio of the total thickness of the non-magnetic layer, magnetic layer and back coat layer to the thickness of the biaxially oriented polyester film is 0.2 to 0.8.

BEST MODE FOR CARRYING OUT THE INVENTION

Figure 1:
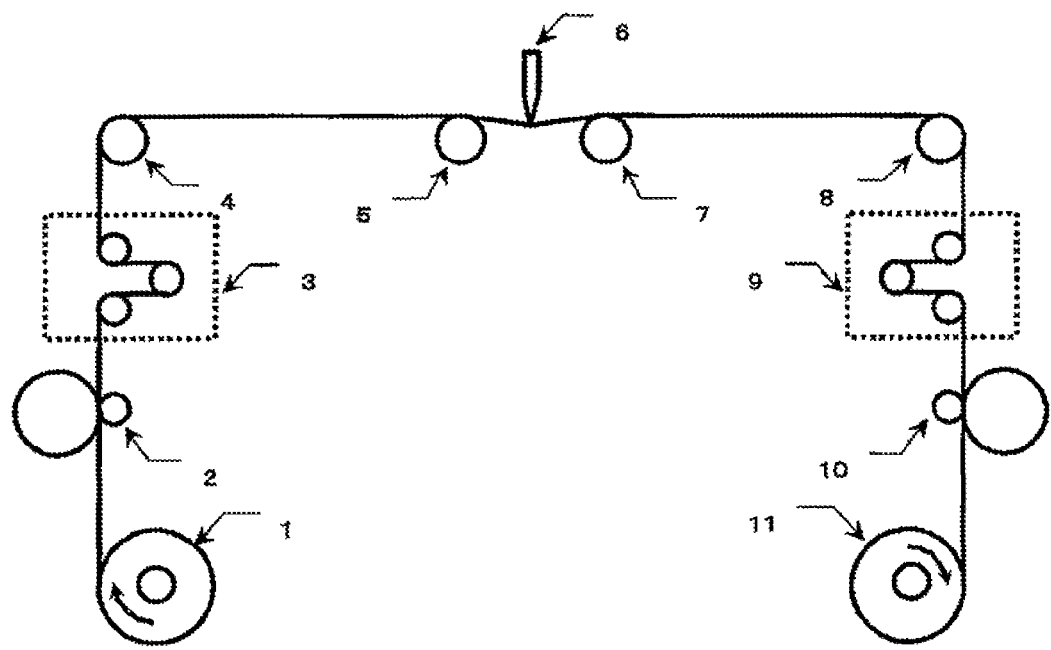
FIG. 1(A) is a diagram of an apparatus for measuring the chipping resistance of a film.
FIG. 1(B) is an enlarged view of the blade of the apparatus and guide rollers located on the right and left sides of the blade.
Figure 1:
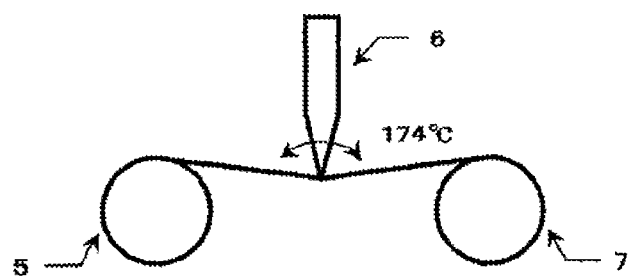

The present invention will be described in detail hereinunder. For the convenience of explanation, the film machine direction of the biaxially oriented polyester film is called "vertical direction, longitudinal direction or MD direction" and the direction orthogonal to the film machine direction is called "width direction, transverse direction or TD direction". The vertical direction, longitudinal direction, transverse direction and width direction of a magnetic recording tape mean the same as the vertical direction, longitudinal direction, transverse direction and width direction of the biaxially oriented polyester film, respectively.

<Polyester>

The biaxially oriented polyester film of the present invention is made from an aromatic polyester. The term "aromatic polyester" as used herein denotes a polymer obtained by polycondensing a diol and an aromatic dicarboxylic acid. Examples of the aromatic dicarboxylic acid include terephthalic acid, isophthalic acid, 2,6-naphthalenedicarboxylic acid and 4,4'-diphenyldicarboxylic acid. Examples of the diol include ethylene glycol, 1,4-butanediol, 1,4-cyclohexanedimethanol and 1,6-hexanediol. Out of these, polyethylene terephthalate and polyethylene-2,6-naphthalene dicarboxylate are preferred from the viewpoint of mechanical properties, and polyethylene-2,6-naphthalene dicarboxylate is particularly preferred because it has high mechanical properties and dimensional stability.

The aromatic polyester in the present invention is not limited to a homopolymer but may be a copolymer or a mixture as far as it does not impair the effect of the present invention. The amount of another component to be copolymerized or mixed is preferably 10 mol % or less, more preferably 5 mol % or less based on the number of mols of the recurring unit. Comonomers known per se may be used, such as a diol component exemplified by diethylene glycol, neopentyl glycol and polyalkylene glycol and a dicarboxylic acid component exemplified by adipic acid, sebacic acid, phthalic acid, isophthalic acid, terephthalic acid and 5-sodium sulfoisophthalic acid. It is preferred that syndiotactic polystyrene should be copolymerized or mixed to reduce the humidity expansion coefficient of the obtained biaxially oriented polyester film and that polyimide should be copolymerized or mixed to improve the mechanical properties or thermal properties of the film.

The intrinsic viscosity of the polyester resin in the present invention is preferably 0.40 or more, more preferably 0.40 to 0.80, particularly preferably 0.5 to 0.7 in o-chlorophenol at 35° C. When the intrinsic viscosity is less than 0.4, breakage may often occur during film formation or the strength of a molded product may become unsatisfactory. When the intrinsic viscosity is higher than 0.8, productivity at the time of polymerization tends to lower.

<Young's Modulus>

The biaxially oriented polyester film of the present invention has a Young's modulus in the film machine direction (YMD) of 6.5 GPa or more, preferably 6.7 GPa or more, more preferably 7.0 GPa or more, particularly preferably 7.5 GPa or more, most preferably 8 GPa or more. When the Young's modulus in the film machine direction (YMD) falls below the lower limit, the film is stretched in the running direction of the magnetic tape, that is, the film machine direction of the film and the width of the film is narrowed while it is caused to run repeatedly as a magnetic tape with the result of the occurrence of track dislocation. This is due to a dimensional change with time (creep) in the width direction of the film caused by applying a load in the film machine direction of the film for a long time. When YMD exceeds the upper limit, it is difficult to set the Young's modulus in the width direction of the film to the above range from the viewpoint of film forming properties. Therefore, YMD is preferably 9 GPa or less.

The Young's modulus in the width direction (YTD) of the biaxially oriented polyester film of the present invention must be 8.2 to 9.8 GPa, preferably 8.5 to 9.5 GPa, more preferably 8.7 to 9.3 GPa. When YTD is outside the above range, the difference between the dimensional changes rate in the width direction of the magnetic head and the tape by temperature variations becomes large with the result of the occurrence of track dislocation. The total of YMD and YTD is 15 to 18 GPa, preferably 16 to 18 GPa. When the total of YMD and YTD falls below the lower limit, the Young's modulus in the film machine direction (YMD) or the Young's modulus in the width direction (YTD) does not become the above value and the dimensional changes rate in the width direction of the film becomes large with the result of the occurrence of track dislocation. When the total of YMD and YTD exceeds the upper limit, it is extremely difficult to form a film (film breakage often occurs), which is not preferred from the viewpoint of productivity.

It is preferred that YTD of the biaxially oriented polyester film of the present invention should be equal to or larger than YMD because a biaxially oriented polyester film having little track dislocation of interest is stably obtained and the surface properties of the obtained biaxially oriented polyester film can be easily made excellent. From this point of view, YTD is preferably 0.5 GPa or more larger than YMD. Meanwhile, the difference between YTD and YMD is preferably 2.5 GPa or less, more preferably 2.0 GPa or less because the dimensional changes rate in the width direction caused by the above creep and temperature and humidity variations can be easily made small.

<Temperature Expansion Coefficient in Width Direction of Film>

Preferably, the biaxially oriented polyester film of the present invention has a temperature expansion coefficient $\alpha t$ in the width direction of the film of $-8$ to $+1$ ppm/° C. It is more preferably $-6$ to $0$ ppm/° C., particularly preferably $-5$ to $-1$ ppm/° C. When $\alpha t$ is outside the above range, the temperature expansion of a layer other than the base film of the obtained magnetic recording tape cannot be fully suppressed and the dimensional changes rate in the width direction of the film by temperature variations becomes large, whereby track dislocation readily occurs. The temperature expansion coefficient can be adjusted by the above Young's modulus in the width direction.

<Humidity Expansion Coefficient in Width Direction of Film>

Preferably, the biaxially oriented polyester film of the present invention has a humidity expansion coefficient $\alpha h$ in the width direction of the film of 5 to 10 ppm/% RH. It is more preferably 6 to 9 ppm/% RH. When $\alpha h$ exceeds the upper limit, the dimensional changes rate in the width direction of the film by humidity variations becomes large, whereby track dislocation readily occurs. When $\alpha h$ falls below the lower limit, $\alpha t$ becomes large in the negative direction and the dimensional changes rate in the width direction by temperature variations becomes large, whereby track dislocation readily occurs. The humidity expansion coefficient can be also adjusted by the above Young's modulus in the width direction.

<Film Thickness>

The thickness of the whole biaxially oriented polyester film of the present invention is preferably 3.0 to 6.0 μm, more preferably 3.5 to 5.5 μm, particularly preferably 4.0 to 5.0 μm. When the thickness exceeds the upper limit, the thickness of the tape becomes large and the length of the tape to be stored in a cassette becomes small, whereby a sufficiently large magnetic recording capacity, especially a recording capacity of more than 500 GB is not obtained or the proportion of the base film to the magnetic recording tape becomes large. Therefore, the magnetic layer and the non-magnetic layer become thin and the magnetic surface becomes roughened by the influence of the surface properties of the base film with the result that output characteristics deteriorate, thereby increasing the error rate. When the thickness falls below the lower limit, the thickness of the film is very small, whereby the film is often broken at the time of film formation, the winding of the film fails, and the suppression of the temperature expansion of a layer other than the base film by the base film of the present invention becomes difficult.

<Heat Shrinkage Factor in Width Direction of Film>

The biaxially oriented polyester film of the present invention has a heat shrinkage factor in the width direction of the film of 0.8% or less, preferably 0.7% or less, particularly preferably 0.6% or less when it is heated at 105° C. under no load for 30 minutes because the dimensional stability of the film can be easily improved. To reduce the heat shrinkage factor, the draw ratio in the width direction of the film is reduced, the drawing temperature in the width direction of the film is increased, the heat setting temperature is increased, or the film is relaxed in the width direction during heat setting. Although the lower limit of heat shrinkage factor is not particularly limited, to carry out relaxation excessively in order to reduce the heat shrinkage factor as much as possible, a higher draw ratio is required to maintain the same Young's modulus, whereby film forming properties are readily impaired. From this point of view, the lower limit of heat shrinkage factor in the width direction of the film is 0.1% or more, more preferably 0.3% or more.

<Rupture Elongation in Width Direction of Film>

The biaxially oriented polyester film of the present invention has a rupture elongation in the width direction of the film of preferably 45% or more, more preferably 47% or more, particularly preferably 50% or more from the viewpoint of film forming properties. When the elongation in the width direction of the film falls below the lower limit, stretching conditions in the width direction become very severe and film forming properties may be impaired. To increase the elongation, the draw ratio in the width direction of the film is reduced, the stretching temperature in the width direction of the film is increased, the heat setting temperature is increased, or the film is relaxed in the width direction during heat setting. Although the upper limit of rupture elongation is not particularly limited as long as the above Young's modulus is obtained, the upper limit is determined naturally from the Young's modulus.

<Crystallinity of Film>

The crystallinity of the biaxially oriented polyester film of the present invention is preferably 28 to 33%, more preferably 29 to 32% when the polyester is polyethylene-2,6-naphthalene dicarboxylate, whereby the surface of the film can be made very flat and high electromagnetic conversion characteristics can be obtained for a magnetic recording tape. The crystallinity is greatly influenced by heat setting temperature and can be made high by increasing the heat setting temperature or extending the heat setting time. For instance, the above crystallinity can be obtained by carrying out heat setting at a temperature of preferably 202 to 210° C., particularly preferably 203 to 208° C. for preferably 1 to 20 seconds. To make the crystallinity higher than the above lower limit, the heat setting temperature must be made high, whereby the surface flatness of even a film having a large Young's modulus in the width direction specified by the present invention can be improved by heat setting with the result that a high-density magnetic recording tape provided by the present invention easily exhibits excellent electromagnetic conversion characteristics. When the crystallinity is made higher than the upper limit, the effect of improving the surface flatness of the film by increasing the heat setting temperature becomes unsatisfactory, thereby causing a reduction in Young's modulus, the deterioration of film forming properties by increasing the draw ratio to eliminate the reduction in Young's modulus, or nonuniformity in the thickness of the film due to the reception of an excessive heat history with the result of impaired surface flatness.

<Dimensional Changes Rate in the Width Direction of Film when a Load is Applied in Film Forming Direction of Film>

When a load of 32 MPa is applied to the biaxially oriented polyester film of the present invention in the film machine direction of the film in a 40° C. and 90% RH atmosphere, the dimensional changes rate in the width direction is preferably more than 0.3% and 1.0% or less, more preferably 0.4 to 0.9% from the viewpoints of film forming properties and track dislocation. The dimensional changes rate in the width direction rate at the time of applying the above load can be reduced by increasing the Young's modulus in the film machine direction or reducing the heat shrinkage factor in the width direction of the film. When the dimensional changes rate in the width direction at the time of applying the above load falls below the lower limit, the Young's modulus in the film machine direction must be increased excessively or the heat shrinkage factor in the width direction of the film must be reduced, whereby a high draw ratio is required, thereby impairing the film forming properties. The reason that the dimensional changes rate in the width direction at the time of applying the above load may be made high is that tension applied to the magnetic recording tape becomes smaller as the recording density of the magnetic recording medium becomes higher, which is totally unexpected from a magnetic recording tape having a low recording density in the prior art. When the dimensional changes rate in the width direction of the film at the time of applying the above load exceeds the upper limit, even if tension applied to the magnetic tape becomes small, the size in the width direction of the film changes while it is used repeatedly, thereby causing track dislocation.

<Surface Roughness and Inert Particles>

The biaxially oriented polyester film of the present invention has a surface roughness WRa (center plane average roughness) of at least one exposed surface of preferably 1 to 10 nm, more preferably 2 to 6 nm, particularly preferably 3 to 5 nm. When this surface roughness WRa is higher than the upper limit, the surface of the magnetic layer becomes rough, thereby deteriorating the electromagnetic conversion characteristics. When the surface roughness WRa is lower than the lower limit, the surface becomes too flat, whereby slippage over a pass roll or a calender becomes worse, the film is wrinkled, the magnetic layer cannot be formed well, or the calendering step becomes unstable.

The biaxially oriented polyester film is not limited to a single-layer film but may be a laminate film consisting of two or more layers which differ from each other in the composition of inert particles contained therein.

When the polyester film of the present invention is a single-layer film, the surface roughness of the both sides of the film is preferably 1 to 10 nm. It is more preferably 2 to 10 nm from the viewpoint of film forming and winding properties and 1 to 7 nm from the viewpoint of electromagnetic conversion characteristics. It is particularly preferably 2 to 7 nm to achieve both film forming and winding properties and electromagnetic conversion characteristics.

In the case of a laminate film, a polyester film layer which contains substantially no inert particles or a small amount of relatively small inert particles if it contains, that is, a layer forming a flat surface is formed on the side on which a magnetic layer is to be formed, and a polyester film layer which contains a large amount of relatively large inert particles, that is, a surface having excellent running properties is formed on the other running surface, that is, a non-magnetic layer side. Since this laminate film provides both electromagnetic conversion characteristics and film winding properties to a magnetic recording tape more easily than the single-layer film, it can be said that the laminate film is a preferred embodiment of the present invention. Preferably, the layer A on the side on which a magnetic layer is to be formed has a surface roughness (WRa (A)) of 0.5 to 4 nm and the layer B on the side on which no magnetic layer is to be formed has a surface roughness (WRa (B)) of 5 to 10 nm, whereby both film forming and winding properties and electromagnetic conversion characteristics can be obtained.

The above surface roughness WRa can be adjusted by containing inert particles, for example, inorganic fine particles containing the element of group IIA, IIB, IVA or IVB of the periodic table (such as kaolin, alumina, titanium oxide, calcium carbonate or silicon dioxide) or organic particles of a polymer having high heat resistance such as crosslinked silicone resin, crosslinked polystyrene or crosslinked acrylic resin particles in the film, or carrying out a surface treatment for forming fine irregularities, for example, coating a lubricant coating.

To contain the inert particles in the film, the average particle diameter of the inert particles is preferably 0.01 to 0.8 μm, more preferably 0.05 to 0.6 μm, particularly preferably 0.1 to 0.4 μm. The content of the inert particles is preferably 0.01 to 0.8 wt %, more preferably 0.03 to 0.6 wt %, particularly preferably 0.05 to 0.4 wt % based on the weight of the entire film in the case of a single-layer film or the weight of the film layer containing the inert particles in the case of a laminate film. As a matter of course, the inert particles contained in the film are not limited to a single component but may be composed of two or more components. It is preferred that inert particles composed of two components or three or more components should be contained in the film layer on the non-magnetic layer side of the laminate film because both tape electromagnetic conversion characteristics and film winding properties can be obtained at the same time.

The surface roughness WRa can be adjusted by suitably selecting the average particle diameter and amount of the inert particles from the above ranges. For instance, the surface roughness WRa can be made large by increasing the average particle diameter or content of the inert particles. As a matter of course, the biaxially oriented polyester film of the present invention may have a coating layer which is formed by coating a lubricant coating. In this case, the lubricant coating may be applied not only to one side but also to both sides. Coating layers known per se may be advantageously used. For example, those enumerated in the pamphlet of WO00/76749 may be used as the coating layer. It is possible to form a coating layer by coating a lubricant coating without containing inert particles in the film.

<Layer Constitution of Film>

As described above, the biaxially oriented polyester film of the present invention may be a single-layer film or a laminate film consisting of a plurality of layers which differ in the type, particle diameter and amount of inert particles contained therein.

It is particularly preferably a double-layer laminate film consisting of layer A and layer B because high film running properties such as winding properties and high surface flatness on the side on which a magnetic layer is to be formed can be easily obtained at the same time.

As for the preferred double-layer laminate film, it is preferred that the layer A should contain inert particles A having an average particle diameter of 0.01 to 0.20 μm in an amount of 0.01 to 0.15 wt % based on the weight of the layer A and that the layer B should contain inert particles B2 having an average particle diameter of 0.2 to 0.4 μm in an amount of 0.01 to 0.2 wt % based on the weight of the layer B. When the average particle diameter of the inert particles A is smaller than 0.01 μm or the content of the inert particles A is lower than 0.01 wt %, winding becomes difficult, chipping occurs or chipping powders are produced by a pass roll, or a scratch is formed at the time of forming a film, thereby causing an error. When the average particle diameter is larger than 0.20 μm or the content is higher than 0.15 wt %, if high dimensional stability is to be provided to a high-density recording medium which the present invention is aimed to attain, the surface of the layer A becomes rough and an error readily occurs. To suppress the error rate significantly, the content of the inert particles A is preferably 0.09 wt % or less.

The layer B preferably contains the above inert particles B2. When the average particle diameter or content of the inert particles B2 falls below the lower limit, air squeezability and friction coefficient become high, whereby it may be difficult to wind the film. When the average particle diameter or content of the inert particles B2 exceeds the above upper limit, the surface of the layer A is greatly tossed by the inert particles B2, thereby impairing the surface properties of the layer A and making it difficult to increase the recording density.

The layer B may be composed of a single component, that is, the inert particles B2 alone but preferably contains inert particles B1 having an average particle diameter of 0.01 to 0.2 μm in an amount of 0.01 to 0.3 wt % based on the weight of the layer B from the viewpoints of the influence upon the surface properties of the magnetic surface of the polyester layer B (improvement of electromagnetic conversion characteristics) and film winding properties. When the average particle diameter or content of the inert particles B1 falls below the lower limit, the friction coefficient becomes high, thereby making it difficult to wind the film, or the surface is shaved and foreign matter produced by shaving is transferred to the surface of the layer A, thereby causing an error. When the average particle diameter or content of the inert particles B1 exceeds the upper limit, the inert particles B1 or agglomerates of the inert particles B1 form large projections which toss the surface, thereby impairing surface flatness. The inert particles B1 preferably have an average particle diameter 0.1 μm or more smaller than that of the inert particles B2 because a combination of the inert particles B1 and B2 provides the effect of improving electromagnetic conversion characteristics and film winding properties more easily. The average particle diameter of the inert particles B1 is preferably 0.05 to 0.2 μm, more preferably 0.10 to 0.15 μm.

Preferred examples of the inert particles A and the inert particles B1 and B2 are those listed for the above inert particles. Spherical silica particles and spherical heat-resistant polymer particles are preferred as the inert particles A and B1 because they provide the effect of the present invention easily. As the inert particle B, heat-resistant polymer particles having low hardness, for example, a Mohs hardness of less than 3 are particularly preferred because the transfer of the rough surface of the layer B to the surface of the layer A can be suppressed.

When a film is to be formed, all the charged polymer does not become a film used as a product. For example, the edge portions of the molten and extruded film are held by clips to stretch the film, remain thick without being stretched and therefore, cannot be used as part of a product. When the width of the formed film is, for example, 4 m and the film is cut to a width of 1 m and divided into three, at least a 1 m portion is not used as part of a product and may be broken during film formation, and the broken film cannot become a product as well. Portions which are not used as part of a product account for several tens of wt % including ear portions at both ends in the width direction of the film. It is desired that these portions should be self-recovered so that they can be collected and re-used in the manufacture of a film, particularly the same film can be used in the film forming process as it is.

To enable the above self-recyclability, the inert particles B1 contained in the layer B are preferably identical to the inert particles A. When the layer B contains the inert particles B1, the recovered polymer can be used as the polymer of the layer B. When the recovered polymer is used in the layer A, the inert particles B2 are existent in the layer A, which may impair the surface flatness of the layer A on which a magnetic layer is to be formed.

To provide excellent recyclability that enables all the amount of the polymer which is not used in a product and is generated during film formation to be recycled while the surface flatness on the side on which a magnetic layer is to be formed is maintained at a practical level, it is preferred that the average particle diameter of the inert particles A should be set to 0.01 to 0.18 μm and the thickness (tB) of the layer B should account for 50 to 90%, specifically 60 to 80% of the thickness of the entire biaxially oriented polyester film. When the (tB/t) ratio falls below the lower limit, the amount of the recovered polymer to be used in the layer B becomes small and it is difficult to recycle all the amount of the recovered polymer. When (tB/t) exceeds the upper limit, the particles of the layer B greatly toss the surface of the layer A, whereby the surface properties of the layer A may be impaired and it may be difficult to increase the recording density.

To provide excellent recyclability that enables half or more of the polymer which does not become a product and is generated during film formation to be recycled while the surface flatness on the side on which a magnetic layer is to be formed is maintained at a level higher than the practical level, the thickness (tB) of the layer B accounts for preferably more than 20% and less than 50% of the thickness (t) of the entire biaxially oriented polyester laminate film, and the ratio (tB/dB) of tB to the average particle diameter (dB) of all the inert particles contained in the layer B is preferably 2 to 30, more preferably 4 to 25. When (tB/t) falls below the lower limit, the amount of the recovered polymer which can be used in the layer B becomes extremely small, and almost all the recovered polymer cannot be used. When (tB/t) exceeds the upper limit, the effect of suppressing the tossing of the surface of the polyester layer A by the inert particles of the polyester layer B lowers and the effect of improving the surface flatness of the polyester layer A becomes small. When the (tB/dB) ratio of the thickness (tB) of the layer B to the average particle diameter (dB) of all the inert particles contained in the polyester layer B falls below the lower limit, the particle diameter of the inert particles contained in the polyester layer B becomes large, the influence on the surface properties of the polyester layer A of tossing becomes large, the effect of suppressing the tossing of the surface of the polyester layer A by the particles of the polyester layer B lowers, and the effect of improving the surface flatness of the polyester layer A becomes small. When the ratio (tB/dB) exceeds the upper limit, the contained inert particles become extremely small and the running and winding properties may be impaired.

Further, tB/dB is preferably 0.5 to 15, more preferably 2 to 10, and tB/t is preferably 10 to 20%, more preferably 12 to 18% to provide extremely excellent surface flatness to the biaxially oriented polyester film of the present invention so as to improve the error rate, thereby making it possible to increase the recording density and to use the recovered polymer in another film. When (tB/t) falls below the lower limit, the particles contained in the layer B may falloff, or chipping occurs in a die coater or the calendering step, thereby causing an error. When (tB/t) exceeds the upper limit, the thickness of the polyester layer B becomes large and the effect of improving the surface flatness of the film becomes unsatisfactory. When the (tB/dB) ratio of the thickness (tB) of the layer B to the average particle diameter (dB) of all the inert particles contained in the polyester layer B falls below the lower limit, the particles contained in the layer B may fall off, or chipping occurs in the die coater or the calendering step, thereby causing an error. When (tB/dB) exceeds the upper limit, the effect of making projections formed by the particles contained in the layer B uniform in height lowers, and the effect of improving the surface flatness becomes unsatisfactory.

<Film Forming Method>

The biaxially oriented polyester film of the present invention whose Young's moduli in the film machine direction and the width direction are set to extremely high specific ranges is preferably manufactured, for example, by the following method because the above Young's moduli can be obtained while the film forming properties are retained.

The above aromatic polyester as a raw material is dried and supplied into an extruder heated at a temperature of the melting point (Tm: ° C.) of the aromatic polyester to (Tm+50)° C. to be extruded into a sheet form from a die such as a T die. This extruded sheet form is solidified by quenching to obtain an unstretched film which is then stretched biaxially. Biaxial stretching may be sequential biaxial stretching or simultaneous biaxial stretching. At least transverse stretching is preferably carried out in two or more stages because this makes it easy to set the Young's modulus in the width direction to the range of the present invention and to stabilize the film forming properties. To increase the Young's modulus in the film machine direction, longitudinal stretching is preferably carried out in two or more stages, that is, longitudinal stretching is carried out again after transverse stretching because this makes it easy to increase the Young's modulus in the film machine direction and to stabilize the film forming properties.

Sequential biaxial stretching in which longitudinal stretching, transverse stretching, transverse re-stretching and heat setting are carried out in this order will be explained herein as an example. Preferably, the aromatic polyester is first stretched to 4.5 to 6.5 times in the longitudinal direction at a temperature of its glass transition temperature (Tg: ° C.) to (Tg+40)° C., to 3.5 to 5.5 times in the transverse direction at (Tg+10) to (Tg+50)° C. which is higher than the above temperature for longitudinal stretching and then at a total transverse draw ratio of 5.5 to 7.0 times which is obtained by multiplying by the previous transverse draw ratio at (Tg+20) to (Tg+110)° C. which is higher than the temperature for transverse stretching, and heat set at (Tg+70) to (Tg+110)° C. for 1 to 20 seconds and further for 1 to 15 seconds.

When the area draw ratio becomes 30 times or more to obtain high Young's moduli in the longitudinal direction and the transverse direction, the surface flatness of the film is easily impaired. In order to further improve the surface flatness of the film in the above situation, it is preferred that the first transverse stretching should be divided into two or more temperature zones, the temperature of the former half stretching zone should be set to (Tg+5) to (Tg+20)° C., the temperature of the latter half stretching zone should be set to (Tg+25) to (Tg+40)° C., the transverse re-stretching should be divided into two or more temperature zones, the temperature of the former half stretching zone should be set to (Tg+45) to (Tg+65)° C., the temperature of the latter half stretching zone should be set to (Tg+80) to (Tg+90)° C., and the heat setting temperature should be set to (Tg+80) to (Tg+90)° C. Heat setting may be carried out simultaneous with transverse re-stretching. In this case, the highest temperature for transverse re-stretching is the heat setting temperature, and heat setting is preferably carried out for 1 to 20 seconds.

When the polyester is polyethylene-2,6-naphthalene dicarboxylate, heat setting is particularly preferably carried out at 202 to 210° C., specifically 203 to 208° C. for 1 to 20 seconds because both surface flatness and film forming properties can be obtained at the same time.

When the draw ratio in the longitudinal direction is high, the Young's modulus in the film machine direction improves but the Young's modulus in the width direction lowers whereas when the draw ratio in the transverse direction is high, the Young's modulus in the film machine direction lowers but the Young's modulus in the width direction improves. Therefore, the draw ratios must be further adjusted according to the target Young's moduli. The sequential biaxial stretching in which longitudinal stretching, transverse stretching, transverse re-stretching and heat setting are carried out in this order can apply to the same manufacturing method in which longitudinal stretching, transverse stretching, longitudinal re-stretching, transverse re-stretching and heat setting are carried out in this order except that the draw ratio of the first longitudinal stretching is 2.0 to 3.5 times, the draw ratio of the first transverse stretching is 3.5 to 5.5 times, and longitudinal re-stretching is carried out at a total longitudinal draw ratio of 4.5 to 6.5 times obtained by multiplying the raw ratio of the previous longitudinal stretching and a total transverse draw ratio of 5.5 to 7.0 times at a temperature between the temperature of transverse stretching and the temperature of transverse re-stretching. Longitudinal stretching is preferably carried out by preheating the film at a temperature of (Tg−20) to (Tg+10)° C. before longitudinal stretching and using an IR heater as a heater to adjust the surface temperature of the film to the above range because the effect of the present invention is easily obtained.

The above description has been given of sequential biaxial stretching. The biaxially oriented polyester film of the present invention can be manufactured by simultaneous biaxial stretching in which longitudinal stretching and transverse stretching are carried out simultaneously. Refer to the draw ratios and the stretching temperatures explained in the foregoing.

When the biaxially oriented polyester film of the present invention is a laminate film, two or more molten polyesters are joined together in the die and extruded into a film form preferably at a temperature of the melting point of the polyester (Tm: ° C.) to (Tm+70)° C., or two or more molten polyesters are extruded from the die, joined together and solidified by quenching to obtain an unstretched laminate film which is then biaxially stretched and heat set like the above single-layer film. To form the above coating layer, it is preferred that a desired coating solution should be applied to one side or both sides of the above unstretched film or monoaxially stretched film and then the obtained film should be biaxially stretched and heat set like the above single-layer film.

<Magnetic Recording Tape>

According to the present invention, a non-magnetic layer and a magnetic layer are formed in this order on one side of the above biaxially oriented polyester film of the present invention as a base film, and a back coat layer is formed on the other side. Although the composition of the non-magnetic layer is not particularly limited, a thermosetting resin or a high-energy ray curable resin containing inorganic fine powders such as silica, alumina or titanium dioxide powders is used. The thickness of the non-magnetic layer is preferably 0.5 to 3.0 µm, more preferably 0.5 to 2.5 µm, particularly preferably 1.0 to 2.0 µm. The above range is preferred because the effect of the present invention is easily obtained.

As for the type of the magnetic layer formed on the non-magnetic layer, a so-called "coating" type magnetic layer formed by applying magnetic powders together with a binder is preferred. The type of the magnetic powders constituting the magnetic layer is not particularly limited, and iron oxide, chromium oxide, cobalt coated iron oxide, and metals and alloys thereof such as iron, cobalt, iron-cobalt, iron-cobalt-nickel and cobalt-nickel are preferably used. Metals and alloys thereof are more preferred than oxides. Although the binder constituting the magnetic layer is not particularly limited, a thermosetting resin-based binder and a high energy ray curable binder are preferred, and the magnetic layer may further contain additives such as a dispersant, lubricant and antistatic agent. For example, a copolymer of vinyl chloride, vinyl acetate and vinyl alcohol, polyurethane, polyisocyanate or a mixture thereof is preferably used. The thickness of the magnetic layer is preferably 0.05 to 0.5 µm, more preferably 0.05 to 0.3 µm, particularly preferably 0.05 to 0.2 µm. The above range is preferred because the effect of the present invention is easily obtained.

Although the back coat layer is not limited to particular composition, a back coat layer containing carbon black and a thermosetting resin-based or high energy ray curable binder is preferred, and the back coat layer may further contain additives such as a dispersant, lubricant and antistatic agent. For example, a copolymer of vinyl chloride, vinyl acetate and vinyl alcohol, polyurethane, polyisocyanate or a mixture thereof is preferably used. The thickness of the back coat layer is preferably 0.1 to 1.0 µm, more preferably 0.3 to 0.8 µm. The above range is preferred because the effect of the present invention is easily obtained.

As for the magnetic recording tape of the present invention, the thickness obtained by subtracting the thickness of the base film from the thickness of the magnetic recording tape is preferably 0.2 to 0.8 time, more preferably 0.2 to 0.6 time, particularly preferably 0.3 to 0.5 time the thickness of the base film. When the above thickness ratio falls below the lower limit, the magnetic layer, the non-magnetic layer and the back coat layer become thin, coating becomes difficult, the surface properties of the base film exert a great influence upon the surface properties of the magnetic layer and the back coat layer, thereby causing an error, and the effect of suppressing temperature expansion with the base film becomes excessive, thereby causing track dislocation. When the thickness ratio exceeds the upper limit, the tape becomes too thick, whereby the length of the tape stored in a cassette becomes short, thereby making it impossible to obtain a sufficiently large magnetic recording capacity and making it difficult to obtain the effect of suppressing temperature expansion with the base film.

As described above, according to the present invention, a biaxially oriented polyester film which has excellent dimensional stability in the width direction when a magnetic recording tape of linear recording system is formed from the biaxially oriented polyester film can be provided, and a magnetic recording tape of linear recording system which rarely sees track dislocation and has excellent dimensional stability can be obtained as a high-density magnetic recording tape having a recording capacity of more than 500 GB by using this biaxially oriented polyester film as a base film. Therefore, the prevent invention is of extremely great industrial value.

EXAMPLES

The following examples are provided to further illustrate the present invention. Various physical property values and characteristic properties in the present invention were measured as follows and defined.

(1) Young's Modulus

The film is cut into a sample having a width of 10 mm and a length of 15 cm, and this sample is pulled with an Instron type universal tensile tester at a chuck interval of 100 mm, a pull speed of 10 mm/min and a chart speed of 500 mm/min to calculate the Young's modulus from the tangent line of a rising portion of the obtained load-elongation curve. The measurement direction is the longitudinal direction of the sample, the Young's modulus is measured 10 times, and the average value of the measurement data is used.

(2) Surface Roughness (WRa)

The center plane average roughness (WRa) is obtained from the following equation by surface analyzing software incorporated in the non-contact 3-D roughness meter (NT-2000) of WYKO Co., Ltd. at a measurement magnification of 25 times and a measurement area of 246.6 µm in the film machine direction×187.5 µm in the width direction (0.0462 mm$^2$). The measurement is repeated 10 times and the average value of the measurement data is used.

$$WRa = \sum_{k=1}^{M}\sum_{j=1}^{N} |z_{jk} - \bar{z}|/(M \cdot N)$$

wherein $$\bar{Z} = \sum_{k=1}^{M}\sum_{j=1}^{N} z_{jk}/(M \cdot N)$$

$Z_{jk}$ is the height of a 3-D roughness chart at a j-th position and a k-th position in the measurement direction (246.6 μm) and a direction (187.5 μm) orthogonal to the measurement direction when these directions are divided into M and N sections, respectively.

(3) Average Particle Diameter of Inert Particles

This is measured with the CP-50 Centrifugal Particle Size Analyzer of Shimadzu Corporation. A particle diameter corresponding to 50 mass percent is read from a cumulative curve showing the particle diameter of each particle and the amount of the particle calculated based on the obtained centrifugal sedimentation curve and taken as the above average particle diameter.

The average particle diameter of the inert particles contained in the film can be measured as follows.

First, the polyester of the surface layer of the film is removed by a low-temperature plasma ashing method (for example, PR-503 of Yamato Kagaku Co., Ltd.) to expose particles. The treating conditions are selected to ensure that the polyester is ashed but the particles are not damaged. The exposed particles are observed through SEM (scanning electron microscope) at a magnification of 10,000 times, an image (light shade formed by the particles) of the particles is linked to an image analyzer (for example, QTM900 of Cambridge Instrument Co., Ltd.), and the area circle equivalent diameters (Di) of at least 5,000 (n) particles are obtained by changing the observation site. The particle size distribution curve is formed from the obtained results to calculate the proportion of the number of particles at each peak (the area of each peak is determined with the boundary as a valley portion of the distribution curve). The number average value represented by the following equation is obtained from the measurement results of the particle diameter and the number of particles in each peak area and taken as the average particle diameter (DA) of the particles. In the case of particles which are agglomerated in the film (for example, alumina particles), the particle diameters (secondary particle diameter) of the agglomerates are measured to obtain the average particle diameter (DA). The identification of the type of the particles can be made by using the quantity analysis of each metal element by SEM-XMA or ICP.

The content of the inert particles in the film can be measured as follows.

First, the total content of the inert particles can be measured from the weight ratio (wt %) of the particles to the sample by shaving off 100 g of the single-layer film or 100 g of each layer in the case of the polyester laminate film as a sample, selecting a solvent which dissolves the polyester but not the particles to dissolve the sample and centrifugally separating the particles from the polyester.

When inorganic particles are existent in the film, a sample obtained in the same manner as described above is combusted in a platinum crucible in a furnace at 1,000° C. for 3 hours or more, and the combusted product in the crucible is mixed with terephthalic acid (powdery) to prepare a 50 g lock-like plate. The total content of the inorganic particles in each layer of this plate can be determined from the calibration curve of each element prepared from the count value of the element with wavelength dispersion type fluorescent X-rays. The X-ray tube for measuring fluorescent X-rays is preferably a Cr tube and may be an Rh tube. The X-ray output is set to 4 kW and the analyzing crystal is changed for each element to be measured. When different types of inorganic particles are existent, the content of each type of inorganic particles can be determined by this measurement.

Further, as for organic particles, the proportion of particles existent in each peak area is calculated from the ratio of the number and the average particle diameter of particles constituting the peak obtained by the measurement of the average particle diameter of the inert particles contained in the film and the density of the particles, and the content (wt %) of particles existent in each peak area is obtained from this proportion of the particles and the total content of inert particles obtained by the measurement of the total amount of the inert particles. When organic particles and inorganic particles are existent, the content of the organic particles and the content of the inorganic particles in each layer can be calculated from the total content of the particles in each layer and the above total content of the inorganic particles.

The densities of typical heat-resistant polymer particles are given below.

Density of crosslinked silicone resin: 1.35 g/cm$^3$
Density of crosslinked polystyrene resin: 1.05 g/cm$^3$
Density of crosslinked acrylic resin: 1.20 g/cm$^3$ The density of the resin constituting the organic particles can be measured with a picnometer in accordance with the method described in "Fine Particle Handbook", Asakura Shoten, 1991, p. 150 by further classifying particles centrifugally separated from the polyester by the above method.

(4) Temperature Expansion Coefficient (αt)

Samples of the film and the magnetic recording tape are cut into pieces having a length of 15 mm and a width of 5 mm in the width direction which is the measurement direction, and these test specimens are set in the TMA3000 of Shinku Riko Co., Ltd. to be pretreated in a nitrogen atmosphere (0% RH) at 60° C. for 30 minutes and cooled to room temperature. Thereafter, the temperature is raised from 25° C. to 70° C. at a rate of 2° C./rain to measure the lengths of the specimens at each temperature in order to calculate their temperature expansion coefficients (αt) from the following equation. The measurement direction is the longitudinal direction of the specimen, the measurement is made 5 times, and the average value of the measurement data is used.

$$\alpha t = \{(L_{60}-L_{40})/(L_{40} \times \Delta T)\} + 0.5$$

wherein,
$L_{40}$: sample length at 40° C. (mm)
$L_{60}$: sample length at 60° C. (mm)
$\Delta T$: 20 (=60-40)° C.
0.5: temperature expansion coefficient (ppm/° C.) of quartz glass (5) Humidity Expansion Coefficient (αh)

Samples of the film and the magnetic recording tape are cut into pieces having a length of 15 mm and a width of 5 mm in the width direction which is the measurement direction, and these test specimens are set in the TMA3000 of Shinku Riko Co., Ltd. and kept in a nitrogen atmosphere at 30° C. by maintaining 30% RH and 70% RH to measure the lengths of the samples so as to calculate their humidity expansion coefficients from the following equation. The measurement direction is the longitudinal direction of the specimen, the measurement is made 5 times, and the average value (αh) of the measurement data is used.

$$\alpha h = (L_{70}-L_{30})/(L_{30} \times \Delta H)$$

wherein,
$L_{30}$: sample length at 30% RH (mm)
$L_{70}$: sample length at 70% RH (mm)
$\Delta H$: 40 (=70-30) % RH (6) Amount of Off-Track Between Magnetic Recording Tape and Head The dimensional change rates (ppm) in the width direction under the following conditions 1 and 2 are calculated from the temperature expansion coefficient and the humidity expansion coefficient measured in (4) and (5) above. The dimensional change rates (ppm) in the width direction of the magnetic head under the following conditions 1 and 2 are calculated from the temperature expansion coefficient (7 ppm/° C.) and the humidity expansion coefficient (0 ppm/% RH). The difference (ppm) in dimensional change rate between the magnetic recording tape and the magnetic head under the following conditions 1 and 2 is taken as the amount of off-track between the magnetic recording tape and the head, and the larger change rate out of the change rates under the following conditions 1 and 2 is taken as the maximum amount of off-track.

Condition 1: 10° C./10% RH→29° C./80% RH
Condition 2: 45° C./10% RH↕10° C./80% RH (7) Amount of Creep Compliance After the film sample is set in the TMA/6000 of Seiko Instruments Co., Ltd. in the MD direction at a film width of 4 mm and a sample chuck interval of 200 mm and kept in a 30° C. atmosphere under a load of 1 g for 30 minutes, the length of the sample is measured and taken as L0. Then, after the film sample is kept under a load of 0.022 GPa for 60 minutes, the length of the sample is measured and taken as L1. The creep compliance is calculated from the following equation.

$$\text{Creep compliance } (GPa^{-1}) = \{(L1-L0)/L0\} \div 0.022$$

(8) Overall Evaluation

The overall evaluation of the sample is ◯ when the maximum amount of off-track measured in (6) is less than 700 ppm and the amount of creep measured in (7) is less than 0.20 and X when any one of the above evaluation items is outside the above range.

(9) Error Rate

The error rate is obtained by recording (recording wavelength of 0.37μ) and reproducing data with an LTO drive. The error rate is obtained from the following equation based on error information (number of error bits) output from the drive and judged by the following criteria based on the error rate of Example 1 (100).

$$\text{Error rate} = (\text{number of error bits/number of write bits})$$

Criteria
◎: less than 50
◯: 50 or more and less than 200
Δ: 200 or more and less than 400
X: 400 or more

(10) Chipping Resistance

The chipping resistance is evaluated based on the deposition of powders on the edge of a blade for testing an industrial razor manufactured by GKI of the U.S. under the following running conditions by using the apparatus shown in FIG. 1 and applying the edge of the blade to the film at an angle of 174°. In the case of a laminate film, the layer B is in contact with the blade. In FIG. 1, reference numeral 1 denotes a feed roll, 2 a tension controller, 3 a tension detector 1 (inlet), 4, 5, 7 and 8 guide rollers (free rollers), 6 a blade, 9 a tension detector 1 (outlet), 10 a speed controller and 11 a wind-up roll.

Running conditions: speed of 60 m/min, tension of 60 g, running length of 50 m

Criteria
◎: the deposition of powders on the edge of the blade is less than 1.0 mm
◯: the deposition of powders on the edge of the blade is 1.0 mm or more and less than 2.0 mm
X: the deposition of powders on the edge of the blade is more than 2.0 mm

(11) Recyclability

When edge waste produced in the manufacturing process of the biaxially oriented polyester film is ground and used in the layer B as a recovered polymer, recyclability is evaluated from the ratio of the usable recovered polymer to the weight of the polymer of the entire film based on the following criteria.

◎: 60 wt % or more of recovered polymer is usable
◯: 50 wt % or more and less than 60 wt % of recovered polymer is usable
Δ: 20 wt % or more and less than 50 wt % of recovered polymer is usable
X: less than 20 wt % of recovered polymer is usable

(12) Heat Shrinkage Factor

After a film having a length of about 30 cm and a width of 1 cm whose length has been accurately measured is put into an oven set to 105° C. under no load, heated for 30 minutes, taken out from the oven and cooled to room temperature, its dimensional change is read. The heat shrinkage factor [(ΔL/L0)×100] is obtained from the length (L0) before the heat treatment and the dimensional change (ΔL) by the heat treatment.

(13) Rupture Elongation

The rupture elongation (%) is obtained from the equation (extended length/original length of sample)×100 when the film is measured at 25° C. and 65% RH with an Instron type tensile tester in accordance with the method specified in JIS K-7127.

(14) Winding Properties

After winding conditions at the time of slitting are optimized, 50 rolls are slit to a size of 1,000 mm (width)×8,000 m at a rate of 50 m/min and the winding properties of the slit films are evaluated based on the following criteria on the condition that a roll without bumps, projections or wrinkles on the surface of the film is accepted.

◎: 40 or more accepted rolls
◯: 35 or more and 39 or less accepted rolls
Δ: 30 or more and 34 or less accepted rolls
X: 29 or less accepted rolls

(15) Film Forming Properties

The film forming state is observed and evaluated based on the following criteria.

◎: no problem such as breakage during film formation and 16 hours or longer continuous film formation possible
◯: no problem such as breakage during film formation and 8 hours or longer continuous film formation possible
Δ: narrow and limited film formable conditions and possible to make a roll as long as 8,000 m or more
X: poor continuous film forming properties and difficult to make a roll as long as 8,000 m or more

(16) Dimensional Change Rate in Width Direction Under No Load

A film (30 cm long) slit to a width of 12.65 mm (½ inch) is set as shown in FIGS. 1(A) and 1(B) in a 23° C. and 50% RH atmosphere. Gold is deposited on the surface of the sample slit to a width of 12.65 mm by sputtering in advance to enable the measurement of the size in the width direction with the detector. In this state, a dead weight of 32 MPa is attached to one end (the other end is fixed) of the film to measure the width (L1) of the film with the laser outer-diameter measuring instrument of Keyence Co., Ltd. (body: Model 3100, sensor: Model 3060).

After a dead weight of 32 MPa is attached to one end (the other side is fixed) in a 49° C. (120° F.) and 90% RH atmosphere and kept in this state for 72 hours (3 days), the dead weight is removed, and the sample is kept in a 23° C. and 50% RH atmosphere for 24 hours, and a dead weight of 32 MPa is attached to one end (the other side is fixed) of the film again to measure the width (L2) of the film with the laser outer-diameter measuring instrument of Keyence Co., Ltd. (body: Model 3100, sensor: Model 3060).

The dimensional changes rate in the width direction (αW) before and after the temperature and humidity treatment under no load is calculated from the measured sizes before and after the above temperature and humidity treatment based on the following equation.

$$\alpha W=\{|L2-L1|/L1\}\times100(\%)$$

(17) Thickness (Entire Film and Each Layer)

As for the thickness of the entire film, the film is measured at 10 points selected at random with a micrometer and the average value of the measurement data is used. As for the thickness of the polyester layer B, the (M+/C+) concentration ratio of the metal element (M+) derived from highest concentration particles out of the particles contained in the film in an area of 5,000 nm from the surface layer excluding the coating layer to the hydrocarbon (C+) of the polyester is taken as a particle concentration, and a portion from the surface to a depth of 5,000 nm in the thickness direction is analyzed. The concentration of the particles is low in the surface layer due to the boundary of the surface and becomes higher as the distance from the surface increases. In the case of the present invention, the concentration of the particles becomes a stable value of 1 and rises to a stable value of 2, or decreases monotonously. Based on this distribution curve, a depth which provides a particle concentration of (stable value of 1+stable value of 2)/2 in the former case or a depth at which the concentration of the particles becomes ½ of the stable value of 1 in the latter case (this depth is larger than the depth which provides a stable value of 1) is taken as the thickness (μm) of the polyester layer B.

The measurement of the polyester layer B is carried out with a secondary ion mass spectroscope (SIMS) (6300 of PERKINELMER INC.) under the following conditions.
type of primary ion: $O_2^+$
primary ion acceleration voltage: 12 KV
primary ion current: 200 nA
luster area: 400 μm
analyzing area: 30% of a gate
measurement vacuum degree: $6.0\times10^{-9}$ Torr
E-GUNN: 0.5 kV-3.0 A.

When particles existent in an area of 5,000 nm from the surface in largest quantity are organic polymer particles other than silicone resin, as it is difficult to measure the particles by SIMS, the concentration distribution curve is measured with FT-IR (Fourier transform infrared spectroscopy) while etching from the surface or XPS (X-ray photoelectric spectroscopy) depending on the type of particles to obtain the thickness of each layer (μm).

The thickness of the other polyester layer is obtained by subtracting the thickness of the polyester layer B from the above total thickness.

(18) Crystallinity

The density of the polyester film is measured by a density gradient tube to obtain crystallinity from the following equation.

$$\text{crystallinity}=\frac{\rho c(\rho-\rho a)}{\rho(\rho-\rho a)}\times100\,[\%]$$

wherein,
ρ: density of polyester film sample
ρa: 1.325 (perfect non-crystal density of polyethylene naphthalate)
ρc: 1.407 (perfect crystal density of polyethylene naphthalate)
The unit is $g/cm^3$.

Example 1

A PEN resin composition 1 containing 0.1 wt % of spherical silica particles with an average particle diameter of 0.1 μm and having an intrinsic viscosity (orthochlorophenol, 35° C.) of 0.60 dl/g and a PEN resin composition 2 containing 0.15 wt % of spherical silica particles with an average particle diameter of 0.3 μm and 0.10 wt % of spherical silica particles with an average particle diameter of 0.14 μm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 1:2 in such a manner that the molten resin composition 1 was positioned on the surface A and the resin composition 2 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

The unstretched film obtained as described above was preheated at 120° C., further heated with an infrared heater having a surface temperature of 830° C. 14 mm from above to be stretched to 5.1 times between low-speed and high-speed rolls, quenched, supplied to a stenter to be stretched to 5.2 times at 150° C. in the transverse direction and then to 1.2 times at 180° C. in the transverse direction and then heat set at 205° C. for 3 seconds to obtain a biaxially oriented polyester film having a thickness of 5.0 μm. The Young's modulus of the obtained film was 6.7 GPa in the longitudinal direction and 9 GPa in the transverse direction.

After a back coating having the following composition was applied to the side A of the film with a die coater and dried, a non-magnetic coating and a magnetic coating having the following compositions were applied to the side B of the film with a die coater at the same time to different thicknesses, magnetically oriented and dried. Further, the film was calendered with a small-sized test calendar (5 sets of steel rolls/nylon rolls) at a temperature of 70° C. and a line pressure of 200 kg/cm and cured at 70° C. for 48 hours. The above tape was slit to a width of 12.65 mm and set in a cassette to obtain a magnetic recording tape. The thicknesses of the back coat layer, non-magnetic layer and magnetic layer after drying were 0.5 μm, 1.2 μm and 0.1 μm, respectively.
Composition of Non-Magnetic Coating
Titanium dioxide fine particles: 100 parts by weight Eslec A (vinyl chloride-vinyl acetate copolymer of Sekisui Chemical Co., Ltd.): 10 parts by weight
Nipporan 2304 (polyurethane elastomer of Nippon Polyurethane Industry Co., Ltd.): 10 parts by weight
Colonate L (polyisocyanate of Nippon Polyurethane Industry Co., Ltd.): 5 parts by weight
Lecithin: 1 part by weight
Methyl ethyl ketone: 75 parts by weight
Methyl isobutyl ketone: 75 parts by weight
Toluene: 75 parts by weight
Carbon black: 2 parts by weight
Lauric acid: 1.5 parts by weight
Composition of Magnetic Coating
Iron (length: 0.3 μm, needle ratio: 10/1, 1800 Oersted): 100 parts by weight
Eslec A (vinyl chloride-vinyl acetate copolymer of Sekisui Chemical Co., Ltd.): 10 parts by weight Nipporan 2304 (polyurethane elastomer of Nippon Polyurethane Industry Co., Ltd.): 10 parts by weight
Colonate L (polyisocyanate of Nippon Polyurethane Industry Co., Ltd.): 5 parts by weight
Lecithin: 1 part by weight
Methyl ethyl ketone: 75 parts by weight
Methyl isobutyl ketone: 75 parts by weight
Toluene: 75 parts by weight
Carbon black: 2 parts by weight
Lauric acid: 1.5 parts by weight
Composition of Back Coating
Carbon black: 100 parts by weight
Thermoplastic polyurethane resin: 60 parts by weight
Isocyanate compound (Colonate L of Nippon Polyurethane Industry Co., Ltd.): 18 parts by weight
Silicone oil: 0.5 part by weight
Methyl ethyl ketone: 250 parts by weight
Toluene: 50 parts by weight The characteristic properties of the obtained biaxially oriented polyester laminate film and the magnetic recording tape are shown in Table 1.

Example 2

A PEN resin composition 3 containing 0.02 wt % of crosslinked silicone resin particles with an average particle diameter of 0.5 μm and 0.30 wt % of spherical silica particles with an average particle diameter of 0.1 μm and having an intrinsic viscosity (orthochlorophenol, 35° C.) of 0.60 dl/g was dried at 180° C. for 5 hours, supplied into the hopper of an extruder, molten at 300° C. in the extruder, extruded onto a casting drum whose surface temperature was kept at 60° C. from a T-shaped extrusion die at a surface finish of 0.3 S and solidified by quenching to obtain an unstretched laminate film.

The unstretched film obtained as described above was preheated at 120° C., further heated with an infrared heater having a surface temperature of 830° C. 14 mm from above to be stretched to 5.5 times between low-speed and high-speed rolls, quenched, supplied to a stentor to be stretched to 4.8 times at 150° C. in the transverse direction and then to 1.2 times at 180° C. in the transverse direction and then heat set at 205° C. for 3 seconds to obtain a biaxially oriented polyester film having a thickness of 5.0 μm. The Young's modulus of the obtained film was 7.5 GPa in the longitudinal direction and 8.5 GPa in the transverse direction.

A non-magnetic coating and a magnetic coating were applied to this film with a die coater at the same time to different thicknesses, magnetically oriented, dry calendered and cured at 70° C. for 48 hours in the same manner as in Example 1. The above tape was slit to a width of 12.65 mm and set in a cassette to obtain a magnetic recording tape.

The characteristic properties of the obtained biaxially oriented polyester laminate film and the magnetic recording tape are shown in Table 1.

Example 3

An unstretched laminate film was obtained in the same manner as in Example 1. The unstretched laminate film obtained as described above was preheated at 120° C., further heated with an infrared heater having a surface temperature of 830° C. 14 mm from above to be stretched to 3.0 times between low-speed and high-speed rolls, quenched, supplied to a stentor to be stretched to 4.0 times at 135° C. in the transverse direction and then heat set at 160° C. for 3 seconds. Subsequently, the film was stretched to 1.9 times at 155° C. in the longitudinal direction, supplied to the stenter to be stretched to 1.7 times at 160° C. in the transverse direction and heat set at 205° C. for 3 seconds to obtain a biaxially oriented polyester film having a thickness of 5.0 μm. The Young's modulus of the obtained film was 8.0 GPa in the longitudinal direction and 9.5 GPa in the transverse direction.

A non-magnetic coating and a magnetic coating were applied to this film with a die coater at the same time to different thicknesses, magnetically oriented, dry calendered and cured at 70° C. for 48 hours in the same manner as in Example 1. The above tape was slit to a width of 12.65 mm and set in a cassette to obtain a magnetic recording tape.

The characteristic properties of the obtained biaxially oriented polyester laminate film and the magnetic recording tape are shown in Table 1.

Comparative Example 1

An unstretched laminate film was obtained in the same manner as in Example 1. The unstretched laminate film obtained as described above was preheated at 120° C., further heated with an infrared heater having a surface temperature of 830° C. 14 mm from above to be stretched to 5.1 times between low-speed and high-speed rolls, quenched, supplied to the stenter to be stretched to 4.6 times at 150° C. in the transverse direction and then heat set at 205° C. for 3 seconds to obtain a biaxially oriented polyester film having a thickness of 5.0 μm. The Young's modulus of the obtained film was 8.0 GPa in the longitudinal direction and 6.5 GPa in the transverse direction.

A non-magnetic coating and a magnetic coating were applied to this film with a die coater at the same time to different thicknesses, magnetically oriented, dry calendered and cured at 70° C. for 48 hours in the same manner as in Example 1. The above tape was slit to a width of 12.65 mm and set in a cassette to obtain a magnetic recording tape.

The characteristic properties of the obtained biaxially oriented polyester laminate film and the magnetic recording tape are shown in Table 1.

Comparative Example 2

An unstretched laminate film was obtained in the same manner as in Example 1. The unstretched laminate film obtained as described above was preheated at 120° C., further heated with an infrared heater having a surface temperature of 830° C. 14 mm from above to be stretched to 4.3 times between low-speed and high-speed rolls, quenched, supplied to the stenter to be stretched to 4.7 times at 150° C. in the transverse direction and then to 1.1 times at 180° C. in the transverse direction, and heat set at 205° C. for 3 seconds to obtain a biaxially oriented polyester film having a thickness of 5.0 μm. The Young's modulus of the obtained film was 6.0 GPa in the longitudinal direction and 9.0 GPa in the transverse direction.

A non-magnetic coating and a magnetic coating were applied to this film with a die coater at the same time to different thicknesses, magnetically oriented, dry calendered and cured at 70° C. for 48 hours in the same manner as in Example 1. The above tape was slit to a width of 12.65 mm and set in a cassette to obtain a magnetic recording tape.

The characteristic properties of the obtained biaxially oriented polyester laminate film and the magnetic recording tape are shown in Table 1.

Comparative Example 3

An unstretched laminate film was obtained in the same manner as in Example 1. The unstretched laminate film obtained as described above was preheated at 120° C., further heated with an infrared heater having a surface temperature of 830° C. 14 mm from above to be stretched to 3.5 times between low-speed and high-speed rolls, quenched, supplied to the stenter to be stretched to 5.4 times at 150° C. in the transverse direction and then to 1.2 times at 180° C. in the transverse direction, and heat set at 205° C. for 3 seconds to obtain a biaxially oriented polyester film having a thickness of 5.0 μm. The Young's modulus of the obtained film was 5.5 GPa in the longitudinal direction and 12.0 GPa in the transverse direction.

A non-magnetic coating and a magnetic coating were applied to this film with a die coater at the same time to different thicknesses, magnetically oriented, dry calendered and cured at 70° C. for 48 hours in the same manner as in Example 1. The above tape was slit to a width of 12.65 mm and set in a cassette to obtain a magnetic recording tape.

The characteristic properties of the obtained biaxially oriented polyester laminate film and the magnetic recording tape are shown in Table 1.

Comparative Example 4

An unstretched laminate film was obtained in the same manner as in Example 1. The unstretched laminate film obtained as described above was preheated at 120° C., further heated with an infrared heater having a surface temperature of 830° C. 14 mm from above to be stretched to 4.9 times between low-speed and high-speed rolls, quenched, supplied to the stenter to be stretched to 4.7 times at 150° C. in the transverse direction and then to 1.1 times at 180° C. in the transverse direction, and heat set at 205° C. for 3 seconds to obtain a biaxially oriented polyester film having a thickness of 5.0 μm. The Young's modulus of the obtained film was 7.0 GPa in the longitudinal direction and 7.3 GPa in the transverse direction.

A non-magnetic coating and a magnetic coating were applied to this film with a die coater at the same time to different thicknesses, magnetically oriented, dry calendered and cured at 70° C. for 48 hours in the same manner as in Example 1. The above tape was slit to a width of 12.65 mm and set in a cassette to obtain a magnetic recording tape.

The characteristic properties of the obtained biaxially oriented polyester laminate film and the magnetic recording tape are shown in Table 1.

Comparative Example 5

A PEN resin composition containing 0.38 wt % of spherical silica particles with an average particle diameter of 0.3 μm and having an intrinsic viscosity (orthochlorophenol, 35° C.) of 0.60 dl/g and a PEN resin composition containing 0.1 wt % of crosslinked polystyrene particles with an average particle diameter of 0.8 μm and 0.9 wt % of crosslinked polystyrene particles with an average particle diameter of 0.3 μm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 40:3 in such a manner that the molten resin composition containing spherical silica particles was positioned on the surface A and the resin composition containing crosslinked polystyrene particles was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

The unstretched film obtained as described above was preheated at 120° C., further heated up to 140° C. with a heating metal roll to be stretched to 4.6 times between low-speed and high-speed rolls, quenched, supplied to the stenter to be stretched to 4.0 times at 145° C. in the transverse direction and then to 1.4 times at 170° C. in the transverse direction, heat set at 215° C. for 3 seconds, relaxed at a relaxation rate of 4.0% in the transverse direction in a 160° C. cooling zone, further 1.2% in the transverse direction in a 120° C. zone, cooled to room temperature and wound up as a film having a thickness of 4.3 μm.

The characteristic properties of the obtained biaxially oriented polyester laminate film and the magnetic recording tape are shown in Table 1.

Example 4

The operation of Example 1 was repeated except that the draw ratio in the longitudinal direction was changed from 5.1 times to 4.7 times, the draw ratio of re-stretching in the transverse direction was changed from 1.2 times to 1.1 times, the heat setting temperature was changed to 200° C., and the thickness was controlled as shown in Table 1.

The characteristic properties of the obtained biaxially oriented polyester laminate film and the magnetic recording tape are shown in Table 1.

Example 5

The operation of Example 1 was repeated except that the draw ratio in the longitudinal direction was changed from 5.1 times to 5.5 times, the draw ratio of re-stretching in the transverse direction was changed from 1.2 times to 1.3 times, the heat setting temperature was changed to 215° C., and the thickness was controlled as shown in Table 1.

The characteristic properties of the obtained biaxially oriented polyester laminate film and the magnetic recording tape are shown in Table 1.

TABLE 1

|  | Unit | Ex. 1 | Ex. 2 | Ex. 3 | C. Ex. 1 | C. Ex. 2 |
|---|---|---|---|---|---|---|
| Film thickness |  |  |  |  |  |  |
| Layer A | μm | 1.7 | 0 | 3.3 | 1.7 | 1.7 |
| Layer B | μm | 3.3 | 5 | 1.7 | 3.3 | 3.3 |
| All layers | μm | 5 | 5 | 5 | 5 | 5 |
| Ratio of layer B |  | 66 | 100 | 34 | 66 | 66 |
| Inert particles |  |  |  |  |  |  |
| Particles A |  |  |  |  |  |  |
| Type of lubricant |  | Spherical silica | — | Spherical silica | Spherical silica | Spherical silica |
| Average particle diameter | μm | 0.1 | — | 0.1 | 0.1 | 0.1 |
| Content | wt % | 0.1 | — | 0.1 | 0.1 | 0.1 |

TABLE 1-continued

| Particles B2 | | | | | | |
|---|---|---|---|---|---|---|
| Type of lubricant | | Spherical silica | Cross-linked silicon | Spherical silica | Spherical silica | Spherical silica |
| Average particle diameter | μm | 0.3 | 0.5 | 0.3 | 0.3 | 0.3 |
| Content | wt % | 0.15 | 0.02 | 0.15 | 0.15 | 0.15 |
| Particles B1 | | | | | | |
| Type of lubricant | | Spherical silica | Spherical silica | Spherical silica | Spherical silica | Spherical silica |
| Average particle diameter | μm | 0.14 | 0.1 | 0.14 | 0.14 | 0.14 |
| Content | wt % | 0.1 | 0.3 | 0.1 | 0.1 | 0.1 |
| Average particle diameter of all particles in layer B (dB) | μm | 0.16 | 0.1 | 0.16 | 0.16 | 0.16 |
| tB/dB | — | 20 | 50 | 11 | 20 | 20 |
| Surface roughness (WRa) | | | | | | |
| Layer A | nm | 3.5 | 6.5 | 3 | 3.5 | 3.5 |
| Layer B | nm | 7.5 | 6.5 | 6.5 | 7.5 | 7.5 |
| Young's modulus | | | | | | |
| Film forming direction | GPa | 6.7 | 7.5 | 8 | 8 | 6 |
| Width direction | GPa | 9 | 8.5 | 9.5 | 6.5 | 9 |
| Film forming direction + width direction | GPa | 15.7 | 17 | 17.5 | 14.5 | 15 |
| Crystallinity | % | 30 | 30 | 30 | 30 | 30 |
| Heat shrinkage factor (width direction) | % | 0.6 | 0.5 | 0.7 | 0.3 | 0.4 |
| Rupture elongation (width direction) | % | 52 | 60 | 48 | 85 | 54 |
| Dimensional change rate under load | % | 0.67 | 0.51 | 0.65 | 0.31 | 0.53 |
| Base film (width direction) | | | | | | |
| Temperature expansion coefficient | ppm/° C. | −2 | −1 | −4 | 7 | −2 |
| Humidity expansion coefficient | ppm/% RH | 7.5 | 8 | 7 | 12 | 7.5 |
| Magnetic tape (width direction) | | | | | | |
| Temperature expansion coefficient | ppm/° C. | 6 | 7.5 | 5 | 12 | 6 |
| Humidity expansion coefficient | ppm/% RH | 8.5 | 9 | 8 | 10.5 | 8.5 |
| Amount of off-track with head | | | | | | |
| Conditions 1 | ppm | 580 | 640 | 520 | 830 | 580 |
| Conditions 2 | ppm | 630 | 610 | 630 | 560 | 630 |
| Maximum (bigger one of the conditions 1 and 2.) | ppm | 630 | 640 | 630 | 830 | 630 |
| Amount of creep compliance | ppm | 0.19 | 0.18 | 0.17 | 0.17 | 0.2 |
| Overall evaluation | — | ○ | ○ | ○ | X | X |
| Film forming properties | — | ○ | Δ | Δ | ◎ | ◎ |
| Winding properties | — | ○ | ◎ | ○ | ○ | ○ |
| Error rate | — | ○ | Δ | ○ | ○ | ○ |
| Chipping resistance | — | ◎ | ◎ | ◎ | ◎ | ◎ |

| | Unit | C. Ex. 3 | C. Ex. 4 | C. Ex. 5 | Ex. 4 | Ex. 5 |
|---|---|---|---|---|---|---|
| Film thickness | | | | | | |
| Layer A | μm | 1.7 | 1.7 | 4 | 1.7 | 1.7 |
| Layer B | μm | 3.3 | 3.3 | 0.3 | 3.3 | 3.3 |
| All layers | μm | 5 | 5 | 4.3 | 5 | 5 |
| Ratio of layer B | | 66 | 66 | 6 | 66 | 66 |
| Inert particles | | | | | | |
| Particles A | | | | | | |
| Type of lubricant | | Spherical silica | Spherical silica | Spherical silica | Spherical silica | Spherical silica |
| Average particle diameter | μm | 0.1 | 0.1 | 0.3 | 0.1 | 0.1 |
| Content | wt % | 0.1 | 0.1 | 0.38 | 0.1 | 0.1 |
| Particles B2 | | | | | | |
| Type of lubricant | | Spherical silica | Spherical silica | Cross-linked polystylene | Spherical silica | Spherical silica |
| Average particle diameter | μm | 0.3 | 0.3 | 0.8 | 0.3 | 0.3 |
| Content | wt % | 0.15 | 0.15 | 0.1 | 0.15 | 0.15 |
| Particles B1 | | | | | | |
| Type of lubricant | | Spherical silica | Spherical silica | Cross-linked polystylene | Spherical silica | Spherical silica |
| Average particle diameter | μm | 0.14 | 0.14 | 0.3 | 0.14 | 0.14 |
| Content | wt % | 0.1 | 0.1 | 0.9 | 0.1 | 0.1 |

TABLE 1-continued

| | | | | | | |
|---|---|---|---|---|---|---|
| Average particle diameter of all particles in layer B (dB) | μm | 0.16 | 0.16 | 0.3 | 0.16 | 0.16 |
| tB/dB | — | 20 | 20 | 1 | 20 | 20 |
| Surface roughness (WRa) | | | | | | |
| Layer A | nm | 3.5 | 3.5 | 14 | 4.7 | 3 |
| Layer B | nm | 7.5 | 7.5 | 20 | 9.8 | 7 |
| Young's modulus | | | | | | |
| Film forming direction | GPa | 5.5 | 7 | 6.2 | 6.7 | 6.7 |
| Width direction | GPa | 12 | 7.3 | 8.3 | 9 | 9 |
| Film forming direction + width direction | GPa | 17.5 | 14.3 | 14.5 | 15.7 | 15.7 |
| Crystallinity | % | 30 | 30 | 35 | 27 | 35 |
| Heat shrinkage factor (width direction) | % | 0.5 | 0.3 | 0.1 | 0.8 | 0.4 |
| Rupture elongation (width direction) | % | 45 | 64 | 62 | 52 | 52 |
| Dimensional change rate under load | % | 0.7 | 0.36 | 0.18 | 0.87 | 0.47 |
| Base film (width direction) | | | | | | |
| Temperature expansion coefficient | ppm/° C. | −10 | 2.5 | 0 | −2 | −2 |
| Humidity expansion coefficient | ppm/% RH | 6 | 10 | 8.5 | 7.5 | 7.5 |
| Magnetic tape (width direction) | | | | | | |
| Temperature expansion coefficient | ppm/° C. | 1 | 9 | 8 | 6 | 6 |
| Humidity expansion coefficient | ppm/% RH | 7 | 10 | 9 | 8.5 | 8.5 |
| Amount of off-track with head | | | | | | |
| Conditions 1 | ppm | 380 | 740 | 650 | 580 | 580 |
| Conditions 2 | ppm | 700 | 630 | 600 | 630 | 630 |
| Maximum (bigger one of the conditions 1 and 2.) | ppm | 700 | 740 | 650 | 630 | 630 |
| Amount of creep compliance | ppm | 0.21 | 0.19 | 0.20 | 0.19 | 0.19 |
| Overall evaluation | — | X | X | X | ○ | ○ |
| Film forming properties | — | ⊚ | ⊚ | ⊚ | ○ | Δ |
| Winding properties | — | ○ | ○ | ⊚ | ○ | ○ |
| Error rate | — | ○ | ○ | X | Δ | ○ |
| Chipping resistance | — | ⊚ | ⊚ | X | ⊚ | ⊚ |

Ex.: Example C. Ex.: Comparative Example

Example 6

A PEN resin composition 4 containing 0.03 wt % of spherical silica particles with an average particle diameter of 0.14 μm and having an intrinsic viscosity (orthochlorophenol, 35° C.) of 0.60 dl/g and a PEN resin composition 5 containing 0.07 wt % of crosslinked silicone resin particles with an average particle diameter of 0.3 μm and 0.10 wt % of spherical silica particles with an average particle diameter of 0.14 μm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 17:33 in such a manner that the molten resin composition 4 was positioned on the surface A and the resin composition 5 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

The unstretched film obtained as described above was preheated at 120° C., further heated with an infrared heater having a surface temperature of 830° C. 14 mm from above to be stretched to 5.1 times between low-speed and high-speed rolls, quenched, supplied to the stenter to be stretched to 5.2 times in the transverse direction at 130° C. in the first half and at 150° C. in the latter half and then to 1.2 times in the transverse direction at 175° C. in the first half and at 205° C. in the latter half. The film was heat set at 205° C. for 3 seconds while it was stretched in the latter half and cooled at 190° C. for 3 seconds to obtain a biaxially oriented polyester film having a thickness of 5.0 μm. The Young's modulus of the obtained film was 6.7 GPa in the longitudinal direction and 9 GPa in the transverse direction.

The operation of Example 1 was repeated to manufacture a magnetic recording tape from the obtained film.

Example 7

A PEN resin composition 6 containing 0.09 wt % of spherical silica particles with an average particle diameter of 0.05 μm and having an intrinsic viscosity (orthochlorophenol, 35° C.) of 0.60 dl/g and a PEN resin composition 7 containing 0.15 wt % of crosslinked silicone resin particles with an average particle diameter of 0.2 μm and 0.20 wt % of spherical silica particles with an average particle diameter of 0.05 μm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 10:40 in such a manner that the molten resin composition 6 was positioned on the surface A and the resin composition 7 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

A biaxially oriented polyester film having a thickness of 5.0 μm was obtained from the unstretched film obtained as described above in the same manner as in Example 6. The Young's modulus of the obtained film was 6.7 GPa in the longitudinal direction and 9 GPa in the transverse direction.

The operation of Example 1 was repeated to manufacture a magnetic recording tape from the obtained film.

Example 8

A PEN resin composition 8 containing 0.01 wt % of spherical silica particles with an average particle diameter of 0.18 µm and having an intrinsic viscosity (orthochlorophenol, 35° C.) of 0.60 dl/g and a PEN resin composition 9 containing 0.02 wt % of crosslinked silicone resin particles with an average particle diameter of 0.4 µm and 0.05 wt % of spherical silica particles with an average particle diameter of 0.18 µm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 24:26 in such a manner that the molten resin composition 8 was positioned on the surface A and the resin composition 9 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

A biaxially oriented polyester film having a thickness of 5.0 µm was obtained from the unstretched film obtained as described above in the same manner as in Example 6. The Young's modulus of the obtained film was 6.7 GPa in the longitudinal direction and 9 GPa in the transverse direction.

The operation of Example 1 was repeated to manufacture a magnetic recording tape from the obtained film.

Example 9

A PEN resin composition 10 containing 0.10 wt % of spherical silica particles with an average particle diameter of 0.14 µm and having an intrinsic viscosity (orthochlorophenol, 35° C.) of 0.60 dl/g and a PEN resin composition 11 containing 0.10 wt % of spherical silica particles with an average particle diameter of 0.3 µm and 0.30 wt % of spherical silica particles with an average particle diameter of 0.14 µm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 17:33 in such a manner that the molten resin composition 10 was positioned on the surface A and the resin composition 11 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

A biaxially oriented polyester film having a thickness of 5.0 µm was obtained from the unstretched film obtained as described above in the same manner as in Example 6. The Young's modulus of the obtained film was 6.7 GPa in the longitudinal direction and 9 GPa in the transverse direction.

The operation of Example 1 was repeated to manufacture a magnetic recording tape from the obtained film.

Example 10

A PEN resin composition 12 containing 0.05 wt % of spherical silica particles with an average particle diameter of 0.20 µm and having an intrinsic viscosity (orthochlorophenol, 35° C.) of 0.60 dl/g and a PEN resin composition 13 containing 0.06 wt % of crosslinked silicone resin particles with an average particle diameter of 0.5 µm and 0.35 wt % of spherical silica particles with an average particle diameter of 0.2 µm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 17:33 in such a manner that the molten resin composition 12 was positioned on the surface A and the resin composition 13 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

A biaxially oriented polyester film having a thickness of 5.0 µm was obtained from the unstretched film obtained as described above in the same manner as in Example 6. The Young's modulus of the obtained film was 6.7 GPa in the longitudinal direction and 9 GPa in the transverse direction.

The operation of Example 1 was repeated to manufacture a magnetic recording tape from the obtained film.

Example 11

An unstretched laminate film was obtained in the same manner as in Example 1.

The unstretched film obtained as described above was preheated at 120° C., further heated with an infrared heater having a surface temperature of 830° C. 14 mm from above to be stretched to 5.5 times between low-speed and high-speed rolls, quenched, supplied to the stenter to be stretched to 4.8 times in the transverse direction at 130° C. in the first half and at 150° C. in the latter half and then to 1.2 times in the transverse direction at 175° C. in the first half and at 205° C. in the latter half and heat set at 190° C. for 3 seconds to obtain a biaxially oriented polyester film having a thickness of 5.0 µm. The Young's modulus of the obtained film was 7.5 GPa in the longitudinal direction and 8.5 GPa in the transverse direction.

The operation of Example 6 was repeated to manufacture a magnetic recording tape from the obtained film.

Example 12

An unstretched laminate film was obtained in the same manner as in Example 6. The unstretched laminate film obtained as described above was preheated at 120° C., further heated with an infrared heater having a surface temperature of 830° C. 14 mm from above to be stretched to 3.0 times between low-speed and high-speed rolls, quenched, supplied to the stenter to be stretched to 4.0 times in the transverse direction at 135° C., heat set at 160° C. for 3 seconds, stretched to 1.9 times in the longitudinal direction at 155° C., supplied to the stenter to be stretched to 1.7 times in the transverse direction at 160° C. and heat set at 205° C. for 3 seconds to obtain a biaxially oriented polyester film having a thickness of 5.0 µm. The Young's modulus of the obtained film was 8.0 GPa in the longitudinal direction and 9.5 GPa in the transverse direction.

The operation of Example 1 was repeated to manufacture a magnetic recording tape from the obtained film.

TABLE 2

| | Unit | Ex. 6 | Ex. 7 | Ex. 8 | Ex. 9 | Ex. 10 | Ex. 11 | Ex. 12 |
|---|---|---|---|---|---|---|---|---|
| Film thickness | | | | | | | | |
| Layer A | μm | 1.7 | 1 | 2.4 | 1.7 | 1.7 | 1.7 | 1.7 |
| Layer B | μm | 3.3 | 4 | 2.6 | 3.3 | 3.3 | 3.3 | 3.3 |
| All layers | μm | 5 | 5 | 5 | 5 | 5 | 5 | 5 |
| Ratio of layer B | | 66 | 80 | 52 | 66 | 66 | 66 | 66 |
| Inert particles | | | | | | | | |
| Particles A | | | | | | | | |
| Type of lubricant | | Spherical silica | Spherical silica | Spherical silica | Spherical silica | Spherical silica | Spherical silica | Spherical silica |
| Average particle diameter | μm | 0.14 | 0.05 | 0.18 | 0.14 | 0.2 | 0.14 | 0.14 |
| Content | wt % | 0.03 | 0.09 | 0.01 | 0.1 | 0.05 | 0.03 | 0.03 |
| Particles B2 | | | | | | | | |
| Type of lubricant | | Cross-linked silicon | Cross-linked silicon | Cross-linked silicon | Spherical silica | Cross-linked silicon | Cross-linked silicon | Cross-linked silicon |
| Average particle diameter | μm | 0.3 | 0.2 | 0.4 | 0.3 | 0.5 | 0.3 | 0.3 |
| Content | wt % | 0.07 | 0.15 | 0.02 | 0.1 | 0.06 | 0.07 | 0.07 |
| Particles B1 | | | | | | | | |
| Type of lubricant | | Spherical silica | Spherical silica | Spherical silica | Spherical silica | Spherical silica | Spherical silica | Spherical silica |
| Average particle diameter | μm | 0.14 | 0.05 | 0.18 | 0.14 | 0.2 | 0.14 | 0.14 |
| Content | wt % | 0.1 | 0.2 | 0.05 | 0.3 | 0.35 | 0.1 | 0.1 |
| Average particle diameter of all particles in layer B (dB) | μm | 0.16 | 0.05 | 0.21 | 0.15 | 0.21 | 0.16 | 0.16 |
| tB/dB | — | 21 | 76 | 12 | 23 | 16 | 21 | 21 |
| Surface roughness (WRa) | | | | | | | | |
| Layer A | nm | 2.5 | 2.5 | 2.5 | 3.5 | 4 | 2.5 | 2.5 |
| Layer B | nm | 6.5 | 6.5 | 6.5 | 7.5 | 10 | 6.5 | 6.5 |
| Young's modulus | | | | | | | | |
| Film forming direction | GPa | 6.7 | 6.7 | 6.7 | 6.7 | 6.7 | 7.5 | 8 |
| Width direction | GPa | 9 | 9 | 9 | 9 | 9 | 8.5 | 9.5 |
| Film forming direction + width direction | GPa | 15.7 | 15.7 | 15.7 | 15.7 | 15.7 | 17 | 17.5 |
| Crystallinity | % | 30 | 30 | 30 | 30 | 30 | 30 | 30 |
| Heat shrinkage factor (width direction) | % | 0.6 | 0.6 | 0.6 | 0.6 | 0.6 | 0.5 | 0.7 |
| Rupture elongation (width direction) | % | 52 | 52 | 52 | 52 | 52 | 60 | 48 |
| Dimensional change rate under load | % | 0.67 | 0.67 | 0.67 | 0.67 | 0.67 | 0.51 | 0.65 |
| Base film (width direction) | | | | | | | | |
| Temperature expansion coefficient | ppm/° C. | −2 | −2 | −2 | −2 | −2 | −1 | −4 |
| Humidity expansion coefficient | ppm/% RH | 7.5 | 7.5 | 7.5 | 7.5 | 7.5 | 8 | 7 |
| Magnetic tape (width direction) | | | | | | | | |
| Temperature expansion coefficient | ppm/° C. | 6 | 6 | 6 | 6 | 6 | 7.5 | 5 |
| Humidity expansion coefficient | ppm/% RH | 8.5 | 8.5 | 8.5 | 8.5 | 8.5 | 9 | 8 |
| Amount of off-track with head | | | | | | | | |
| Condition 1 | ppm | 580 | 580 | 580 | 580 | 580 | 640 | 520 |
| Condition 2 | ppm | 630 | 630 | 630 | 630 | 630 | 610 | 630 |
| Maximum (bigger one of the conditions 1 and 2.) | ppm | 630 | 630 | 630 | 630 | 630 | 640 | 630 |
| Amount of creep compliance | ppm | 0.19 | 0.19 | 0.19 | 0.19 | 0.19 | 0.18 | 0.17 |
| Overall evaluation | — | ○ | ○ | ○ | ○ | ○ | ○ | ○ |
| Film forming properties | — | ○ | ○ | ○ | ○ | ○ | Δ | Δ |
| Winding properties | — | Δ | Δ | Δ | ◎ | ◎ | Δ | Δ |
| Error rate | — | ◎ | ◎ | ◎ | ○ | Δ | ◎ | ◎ |
| Recyclability | — | ◎ | ◎ | ○ | ◎ | ◎ | ◎ | ◎ |
| Chipping resistance | — | ◎ | ◎ | ◎ | ◎ | ◎ | ◎ | ◎ |

Ex.: Example

Example 13

A PEN resin composition 14 containing 0.05 wt % of spherical silica particles with an average particle diameter of 0.14 μm and having an intrinsic viscosity (orthochlorophenol, 35° C.) of 0.60 dl/g and a PEN resin composition 15 containing 0.07 wt % of crosslinked silicone resin particles with an average particle diameter of 0.3 μm and 0.10 wt % of spherical silica particles with an average particle diameter of 0.14 μm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 33:17 in such a manner that the molten resin composition 14 was positioned on the surface A and the resin composition 15 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

The unstretched film obtained as described above was preheated at 120° C., further heated with an infrared heater having a surface temperature of 830° C. 14 mm from above to be stretched to 5.1 times between low-speed and high-speed rolls, quenched, supplied to the stenter to be stretched to 5.2 times in the transverse direction at 130° C. in the first half and at 150° C. in the latter half and then to 1.2 times in the transverse direction at 175° C. in the first half and at 205° C. in the latter half. The film was heat set at 205° C. for 3 seconds while stretching at 205° C. in the latter half and then cooled to 190° C. for 3 seconds to obtain a biaxially oriented polyester film having a thickness of 5.0 µm. The Young's modulus of the obtained film was 6.7 GPa in the longitudinal direction and 9 GPa in the transverse direction.

The operation of Example 1 was repeated to manufacture a magnetic recording tape from the obtained film.

Example 14

A PEN resin composition 16 containing 0.01 wt % of spherical silica particles with an average particle diameter of 0.18 µm and having an intrinsic viscosity (orthochlorophenol, 35° C.) of 0.60 dl/g and a PEN resin composition 17 containing 0.02 wt % of crosslinked silicone resin particles with an average particle diameter of 0.4 µm and 0.05 wt % of spherical silica particles with an average particle diameter of 0.18 µm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 44:6 in such a manner that the molten resin composition 16 was positioned on the surface A and the resin composition 17 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

A biaxially oriented polyester film having a thickness of 5.0 µm was obtained from the unstretched film obtained as described above in the same manner as in Example 10. The Young's modulus of the obtained film was 6.7 GPa in the longitudinal direction and 9 GPa in the transverse direction.

The operation of Example 1 was repeated to manufacture a magnetic recording tape from the obtained film.

Example 15

A PEN resin composition 18 containing 0.15 wt % of spherical silica particles with an average particle diameter of 0.05 µm and having an intrinsic viscosity (orthochlorophenol, 35° C.) of 0.60 dl/g and a PEN resin composition 19 containing 0.15 wt % of crosslinked silicone resin particles with an average particle diameter of 0.2 µm and 0.30 wt % of spherical silica particles with an average particle diameter of 0.05 µm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 26:24 in such a manner that the molten resin composition 18 was positioned on the surface A and the resin composition 19 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

A biaxially oriented polyester film having a thickness of 5.0 µm was obtained from the unstretched film obtained as described above in the same manner as in Example 13. The Young's modulus of the obtained film was 6.7 GPa in the longitudinal direction and 9 GPa in the transverse direction.

The operation of Example 1 was repeated to manufacture a magnetic recording tape from the obtained film.

Example 16

A PEN resin composition 24 containing 0.05 wt % of spherical silica particles with an average particle diameter of 0.14 µm and having an intrinsic viscosity (orthochlorophenol, 35° C.) of 0.60 dl/g and a PEN resin composition 25 containing 0.07 wt % of crosslinked silicone resin particles with an average particle diameter of 0.3 µm and 0.10 wt % of spherical silica particles with an average particle diameter of 0.14 µm and having an intrinsic viscosity (orthochlorophenol, 35° C.) of 0.60 dl/g were each dried at 180° C. for 5 hours, supplied into the hopper of an extruder, molten at 300° C. in the extruder, joined together in a ratio of 47:3 in such a manner that the molten resin composition 24 was positioned on the surface A and the resin composition 25 was positioned on the surface B, extruded onto a casting drum whose surface temperature was kept at 60° C. from a T-shaped extrusion die at a surface finish of 0.3 S while they were kept joined together and solidified by quenching to obtain an unstretched laminate film.

A biaxially oriented polyester film having a thickness of 5.0 µm was obtained from the unstretched film obtained as described above in the same manner as in Example 13. The Young's modulus of the obtained film was 6.7 GPa in the longitudinal direction and 9 GPa in the transverse direction.

The operation of Example 1 was repeated to manufacture a magnetic recording tape from the obtained film.

Example 17

An unstretched laminate film was obtained in the same manner as in Example 13.

The unstretched film obtained as described above was preheated at 120° C., further heated with an infrared heater having a surface temperature of 830° C. 14 mm from above to be stretched to 5.5 times between low-speed and high-speed rolls, quenched, supplied to the stenter to be stretched to 4.8 times in the transverse direction at 150° C. and then to 1.2 times in the transverse direction at 180° C., and heat set at 205° C. for 3 seconds to obtain a biaxially oriented polyester film having a thickness of 5.0 µm. The Young's modulus of the obtained film was 7.5 GPa in the longitudinal direction and 8.5 GPa in the transverse direction.

The operation of Example 1 was repeated to manufacture a magnetic recording tape from the obtained film.

Example 18

An unstretched laminate film was obtained in the same manner as in Example 13.

The unstretched film obtained as described above was preheated at 120° C., further heated with an infrared heater having a surface temperature of 830° C. 14 mm from above to be stretched to 3.0 times between low-speed and high-speed rolls, quenched, supplied to the stenter to be stretched to 4.0 times in the transverse direction at 135° C., heat set at 160° C. for 3 seconds, stretched to 1.9 times in the longitudinal direction at 155° C., supplied to the stenter to be stretched to 1.7 times in the transverse direction at 160° C., and heat set at 205° C. for 3 seconds to obtain a biaxially oriented polyester film having a thickness of 5.0 μm. The Young's modulus of the obtained film was 8.0 GPa in the longitudinal direction and 9.5 GPa in the transverse direction.

The operation of Example 1 was repeated to manufacture a magnetic recording tape from the obtained film.

TABLE 3

|  | Unit | Ex. 13 | Ex. 14 | Ex. 15 | Ex. 16 | Ex. 17 | Ex. 18 |
|---|---|---|---|---|---|---|---|
| Film thickness | | | | | | | |
| Layer A | μm | 3.3 | 4.4 | 2.6 | 4.7 | 3.3 | 3.3 |
| Layer B | μm | 1.7 | 0.6 | 2.4 | 0.3 | 1.7 | 1.7 |
| All layers | μm | 5 | 5 | 5 | 5 | 5 | 5 |
| Ratio of layer B | | 34 | 12 | 48 | 6 | 34 | 34 |
| Inert particles | | | | | | | |
| Particles A | | | | | | | |
| Type of lubricant | | Spherical silica | Spherical silica | Spherical silica | Spherical silica | Spherical silica | Spherical silica |
| Average particle diameter | μm | 0.14 | 0.18 | 0.05 | 0.14 | 0.14 | 0.14 |
| Content | wt % | 0.05 | 0.01 | 0.15 | 0.05 | 0.05 | 0.05 |
| Particles B2 | | | | | | | |
| Type of lubricant | | Cross-linked silicon | Cross-linked silicon | Cross-linked silicon | Cross-linked silicon | Cross-linked silicon | Cross-linked silicon |
| Average particle diameter | μm | 0.3 | 0.4 | 0.2 | 0.3 | 0.3 | 0.3 |
| Content | wt % | 0.07 | 0.02 | 0.15 | 0.07 | 0.07 | 0.07 |
| Particles B1 | | | | | | | |
| Type of lubricant | | Spherical silica | Spherical silica | Spherical silica | Spherical silica | Spherical silica | Spherical silica |
| Average particle diameter | μm | 0.14 | 0.18 | 0.05 | 0.14 | 0.14 | 0.14 |
| Content | wt % | 0.1 | 0.05 | 0.3 | 0.1 | 0.1 | 0.1 |
| Average particle diameter of all particles in layer B (dB) | μm | 0.16 | 0.21 | 0.11 | 0.16 | 0.16 | 0.16 |
| tB/dB | — | 11 | 3 | 22 | 2 | 11 | 11 |
| Surface roughness (WRa) | | | | | | | |
| Layer A | nm | 2.5 | 2.5 | 2.5 | 2 | 2.5 | 2.5 |
| Layer B | nm | 5.5 | 5.5 | 5.5 | 4.5 | 5.5 | 5.5 |
| Young's modulus | | | | | | | |
| Film forming direction | GPa | 6.7 | 6.7 | 6.7 | 6.7 | 7.5 | 8 |
| Width direction | GPa | 9 | 9 | 9 | 9 | 8.5 | 9.5 |
| Film forming direction + width direction | GPa | 15.7 | 15.7 | 15.7 | 15.7 | 17 | 17.5 |
| Crystallinity | % | 30 | 30 | 30 | 30 | 30 | 30 |
| Heat shrinkage factor (width direction) | % | 0.6 | 0.6 | 0.6 | 0.6 | 0.5 | 0.7 |
| Rupture elongation (width direction) | % | 52 | 52 | 52 | 52 | 60 | 48 |
| Dimensional change rate under load | % | 0.67 | 0.67 | 0.67 | 0.67 | 0.51 | 0.65 |
| Base film (width direction) | | | | | | | |
| Temperature expansion coefficient | ppm/° C. | −2 | −2 | −2 | −2 | −1 | −4 |
| Humidity expansion coefficient | ppm/% RH | 7.5 | 7.5 | 7.5 | 7.5 | 8 | 7 |
| Magnetic tape (width direction) | | | | | | | |
| Temperature expansion coefficient | ppm/° C. | 6 | 6 | 6 | 6 | 7.5 | 5 |
| Humidity expansion coefficient | ppm/% RH | 8.5 | 8.5 | 8.5 | 8.5 | 9 | 8 |
| Amount of off-track with head | | | | | | | |
| Condition 1 | ppm | 580 | 580 | 580 | 580 | 640 | 520 |
| Condition 2 | ppm | 630 | 630 | 630 | 630 | 610 | 630 |
| Maximum (bigger one of the conditions 1 and 2.) | ppm | 630 | 630 | 630 | 630 | 640 | 630 |
| Amount of creep compliance | ppm | 0.19 | 0.19 | 0.19 | 0.19 | 0.18 | 0.17 |
| Overall evaluation | — | ◯ | ◯ | ◯ | ◯ | ◯ | ◯ |
| Film forming properties | — | ◯ | ◯ | ◯ | ◯ | Δ | Δ |
| Winding properties | — | Δ | Δ | Δ | Δ | Δ | Δ |
| Error rate | — | ◎ | ◎ | ◎ | ◎ | ◎ | ◎ |
| Recyclability | — | Δ | X | Δ | X | Δ | Δ |
| Chipping resistance | — | ◎ | ◯ | ◎ | X | ◎ | ◎ |

Ex.: Example

The biaxially oriented polyester film of the present invention can be advantageously used as a base film for magnetic recording tapes of linear recording system and data storage tapes for the back-up of computers, especially linear tape-open (LTO) tapes.

The invention claimed is:

1. A magnetic recording tape comprising a base film of the magnetic recording tape which is a biaxially oriented polyester film having a Young's modulus in a film machine direction (TMD) of 6.5 GPa or more and a Young's modulus in a film machine direction (TMD) of 6.5 GPa or more and a Young's modulus in width direction (YTD) of 8.2 to 9.8 GPa wherein YTD is larger than YMD by 0.5 to 2.5 GPa,
the biaxially oriented polyester film has a temperature expansion coefficient in the film width direction of −5 to −1 ppm/° C., and a thickness of 3 to 6 μm,
the magnetic recording tape is under a linear recording system, and
a non-magnetic layer and a magnetic layer formed on one side of the film and a back coat layer formed on the other side.

2. The magnetic recording tape according to claim 1, wherein a total thickness of the non-magnetic layer, magnetic layer and back coat layer is 0.2 to 0.8 based on a thickness of the biaxially oriented polyester film.

3. The magnetic recording tape according to claim 1, wherein the polyester is polyethylene-2,6-naphthalene dicarboxylate.

4. The magnetic recording tape according to claim 1, wherein a total of YMD and YTD is 15 to 18 GPa.

5. The magnetic recording tape according to claim 1, which has a humidity expansion coefficient in the film width direction of 5 to 10 ppm % RH.

6. The magnetic recording tape according to claim 1, which has a heat shrinkage factor (105° C.×30 minutes) in the film width direction of 0.8% or less.

7. The magnetic recording tape according to claim 1, which has a rupture elongation in the film width direction of 45% or more.

8. The magnetic recording tape according to claim 1, which has a crystallinity of 28 to 33%.

9. The magnetic recording tape according to claim 1, which has a dimensional change in the film width direction of more than 0.3% and 1% or less when a load of 32 MPa is applied thereto in the film machine direction in a 40° C. and 90% RH atmosphere.

10. The magnetic recording tape according to claim 1, wherein a surface roughness (WRa) of at least one surface is 1 to 10 nm.

11. The magnetic recording tape according to claim 1, which is a single-layer film and has a surface roughness (WRa) of 1 to 10 nm.

12. The magnetic recording tape according to claim 1, which is a laminate film consisting of two polyester film layers A and B.

13. The magnetic recording tape according to claim 12, wherein the layer A is formed on the side on which a magnetic layer is to be formed and has a surface roughness (WRa(A)) of 0.5 to 4 nm and the layer B is formed on the side on which no magnetic layer is to be formed and has a surface roughness (WRa(B)) of 5 to 10 nm.

14. The magnetic recording tape according to claim 12, wherein the layer A contains inert particles A having an average particle diameter of 0.01 to 0.20 μm in an amount of 0.01 to 0.15 wt % based on a weight of the layer A and the layer B contains inert particles B2 having an average particle diameter of 0.2 to 0.4 μm in an amount of 0.01 to 0.2 wt % based on a weight of the layer B.

15. The magnetic recording tape according to claim 14, wherein the layer B contains inert particles B1 having an average particle diameter of 0.01 to 0.20 μm in an amount of 0.01 to 0.3 wt % based on a weight of the layer B besides the inert particles B2.

16. The magnetic recording tape according to claim 14, wherein the average particle diameter of the inert particles A is 0.01 to 0.18 μm, a thickness (t) of the entire film is 3 to 6 μm, and a thickness (tB) of the layer B accounts for 50 to 90% of the thickness (t) of the entire film.

17. The magnetic recording tape according to claim 14, wherein the thickness (t) of the entire film is 3 to 6 μm, a thickness (tB) of the layer B accounts for more than 20% and less than 50% of a thickness (t) of the entire film, and the value (tB/dB) obtained by dividing tB by the average particle diameter (dB) of all the inert particles contained in the layer B is 2 to 30.

18. The magnetic recording tape according to claim 14, wherein the thickness (t) of the entire film is 3 to 6 μm, a thickness (tB) of the layer B accounts for 10 to 20% of a thickness (t) of the entire film, and the value (tB/dB) obtained by dividing tB by the average particle diameter (dB) of all the inert particles contained in the layer B is 0.5 to 15.

19. The magnetic recording tape according to claim 14, wherein the inert particles A are spherical silica particles or heat-resistant polymer particles.

20. The magnetic recording tape according to claim 15, wherein the inert particles B1 have an average particle diameter 0.1 μm or more smaller than that of the inert particles B2.

21. The magnetic recording tape according to claim 15, wherein the inert particles A and the inert particles B1 are of a same chemical species.

22. The magnetic recording tape according to claim 14, wherein the inert particles B2 are crosslinked organic particles.

23. The magnetic recording tape according to claim 1, wherein the temperature expansion coefficient in the film width direction (YTD) is −4 to −1 ppm/° C.

* * * * *